US008606904B2

(12) United States Patent
Waugaman et al.

(10) Patent No.: US 8,606,904 B2
(45) Date of Patent: Dec. 10, 2013

(54) APPARATUS AND METHOD OF ADMINISTERING MODULAR ONLINE ENVIRONMENTS

(75) Inventors: Scott Christopher Waugaman, San Francisco, CA (US); Mitchell Robert Jay Goodwin, London (GB); Adrian Kieran O'Grady, London (GB); Jonathan Leslié Venables, London (GB)

(73) Assignee: Sony Computer Entertainment Europe Limited (GB)

( * ) Notice: Subject to any disclaimer, the term of this patent is extended or adjusted under 35 U.S.C. 154(b) by 576 days.

(21) Appl. No.: 12/740,483

(22) PCT Filed: Sep. 25, 2008

(86) PCT No.: PCT/GB2008/003262
§ 371 (c)(1),
(2), (4) Date: Oct. 19, 2010

(87) PCT Pub. No.: WO2009/056787
PCT Pub. Date: May 7, 2009

(65) Prior Publication Data
US 2011/0185057 A1   Jul. 28, 2011

(30) Foreign Application Priority Data
Oct. 29, 2007   (EP) .................................. 07254272

(51) Int. Cl.
G06F 15/173   (2006.01)

(52) U.S. Cl.
USPC ...................................................... 709/224

(58) Field of Classification Search
USPC ........................... 709/204, 223–224; 715/753
See application file for complete search history.

(56) References Cited
U.S. PATENT DOCUMENTS
6,256,043 B1 * 7/2001 Aho et al. .................... 345/629

8,047,909 B2 * 11/2011 Walker et al. .................... 463/16
(Continued)

OTHER PUBLICATIONS

"Online Wedding", In Wikipedia [Online][Retrieved on Sep. 11, 2007]. Retrieved from the Internet: <http://en.wikipedia.org/wiki/Online_wedding>.

(Continued)

Primary Examiner — Oanh Duong
(74) Attorney, Agent, or Firm — Lerner, David, Littenberg, Krumholz & Mentlik, LLP

(57) ABSTRACT

In a modular on-line virtual environment, in which each module of the on-line virtual environment has a plurality of parallel instances each able to host a limited number of users, a server arranged to administer the modular on-line virtual environment comprises a network communications arrangement operable to receive data representative of the actions of users within an instance of a first module of the modular on-line virtual environment, and to transmit to each user within that instance of that module data representative of the actions of each other user within that instance of that module, behavior analysis means operable to analyze user behavior within that instance of the first module, in which if the behavior of two or more users satisfies a predetermined criterion then the two or more users are classified as belonging to a social group comprising the two or more users, module instance selection means operable to select an instance of a second module for a user when that user moves within the modular on-line virtual environment from the first module to a second module, in which the module instance selection means is operable to select an instance of the second module that has the capacity to accommodate the greatest number of the common social group once one member of that social group moves within the modular on-line virtual environment from the first module to the second module and the server is operable to place a subsequent respective member of the social group in that same selected instance of the second module if that member moves within the modular on-line virtual environment from the first module to the second module.

11 Claims, 17 Drawing Sheets

(56) References Cited

U.S. PATENT DOCUMENTS

| | | | |
|---|---|---|---|
| 2003/0037149 A1* | 2/2003 | Hess | 709/227 |
| 2003/0156134 A1* | 8/2003 | Kim | 345/753 |
| 2005/0172001 A1* | 8/2005 | Zaner et al. | 709/205 |
| 2005/0177822 A1* | 8/2005 | Kuch et al. | 717/155 |
| 2009/0089157 A1* | 4/2009 | Narayanan | 705/14 |
| 2010/0144346 A1* | 6/2010 | Malomsoky et al. | 455/434 |
| 2010/0220097 A1* | 9/2010 | Hamilton et al. | 345/419 |

OTHER PUBLICATIONS

Terdiman, "New Gateway to Multiple Virtual Worlds?", CNET News.com. [Online]. Published Dec. 6, 2005 [Retrieved on Sep. 11, 2007]. Retrieved from the Internet: <http://news.com.com/New+gateway+to+multiple+virtual+worlds/2100-1043_3-5983264.html>.

Beans, Making a Freinds List: In Xbox.com. [Online] [Retrieved on Sep. 13, 2007]. Retrieved from the Internet: <http://www.xbox.com/en-US/live/features/friendslist.htm>.

European Search Report, EP 07254272, dated May 27, 2008.

International Search Report and Written Opinion, PCT/GB2008/003262, dated Apr. 6, 2009.

European Patent Office Notice, XPOO2456252. The technical aspects identified in the present application (Art. 92 EPC) are considered part of common general knowledge. Due to their notoriety no documentary evidence is found to be required. For further details see the accompanying Opinion and the reference below. (Nov. 2007).

\* cited by examiner

APPARATUS AND METHOD OF ADMINISTERING MODULAR ONLINE ENVIRONMENTS

CROSS REFERENCE TO RELATED APPLICATIONS

The present application is a national phase entry under 35 U.S.C. §371 of International Application No. PCT/GB2008/003262, filed Sep. 25, 2008, published in English, which claims the benefit of European Patent Application No. 07254272.3, filed Oct. 29, 2007. The entire disclosures of each of the above-identified applications are incorporated by reference herein.

The present invention relates to an apparatus and method of administering modular online environments.

Many distinct on-line environments exist today, such as World of Warcraft™, Everquest™, and Second Life™. To a greater or lesser extent, each of these virtual environments foster social groupings though the provision of virtual facilities; for example, see http://en.wikipedia.org/wiki/Online_wedding.

Other on-line environments have been proposed in which each distinct environment is defined by a set of resources interpreted by a common so-called 'game engine' (see http://news.com.com/New+gateway+to+multiple+virtual+worlds/2100-1043_3-5983264.html) Using this game engine, players potentially have access to many different on-line environments whilst developers have access to the totality of existing players of other on-line environments using the same engine.

Maintaining the continuity of social groupings in a system where a pool of users can easily switch between different online environments may prove difficult. One solution is to provide an overarching social structure by the provision of an external 'friends' management system, which can search for established friends in any online game that supports this feature. Such a system can be found, for example, in Xbox live (http://www.xbox.com/en-US/live/features/friendslist.htm).

However, there is still scope to improve the continuity of social groupings within disparate environments, especially before such groupings become fully established and explicitly defined by their members.

The present invention seeks to mitigate or alleviate the above problem.

In a first aspect of the present invention, a server is arranged to administer a modular on-line virtual environment wherein each module of the on-line virtual environment has a plurality of parallel instances each able to host a limited number of users. The server comprises a network communications arrangement operable to receive data representative of the actions of users within an instance of a first module of the modular on-line virtual environment, and to transmit to each user within that instance of that module data representative of the actions of each other user within that instance of that module, behavior analysis means operable to analyze user behavior within that instance of the first module, in which if the behavior of two or more users satisfies a predetermined criterion then the two or more users are classified as belonging to a social group comprising the two or more users, module instance selection means operable to select an instance of a second module for a user when that user moves within the modular on-line virtual environment from the first module to a second module in which the module instance selection means is operable to select an instance of the second module that has the capacity to accommodate one or more further members of the social group once a first user classified as a member of that social group moves within the modular on-line virtual environment from the first module to the second module, and if a subsequent respective user, classified as a member of the same social group as the first user, moves within the modular on-line virtual environment from the first module to the second module, the server is operable to place that subsequent respective user in the same selected instance of the second module as the first user.

In a second aspect of the present invention an entertainment device is provided for interaction with a modular on-line virtual environment, wherein each module of the on-line virtual environment has a plurality of parallel instances each able to host a limited number of users. The entertainment device comprises a display generator arranged to generate for display a representation of an instance of a first module of the on-line virtual environment, that instance of the first module of the on-line virtual environment being able to host interactions between a user of the entertainment device and other users of one or more remote entertainment devices, a network communications arrangement operable to receive data representative of the actions of the other users within that instance of the first module of the on-line virtual environment, behavior analysis means operable to analyze user behavior within that instance of the first module, in which if the behavior of the user of the entertainment device and one or more other users of respective remote entertainment devices satisfies a predetermined criterion then these two or more users are classified as belonging to a social group comprising the two or more users, and the network communications arrangement is operable to transmit to a server administering that instance of the first module of the on-line virtual environment, data indicative of the users belonging to the social group.

Advantageously, therefore, by classifying users as members of social groups according to their actions, users can remain together as they are moved within a modular virtual environment, without having to explicitly declare a wish to do so. As a result, users can more easily develop associations and friendships with each other during an on-line encounter.

Further respective aspects and features of the invention are defined in the appended claims.

Embodiments of the present invention will now be described by way of example with reference to the accompanying drawings, in which.

Figure 11A:
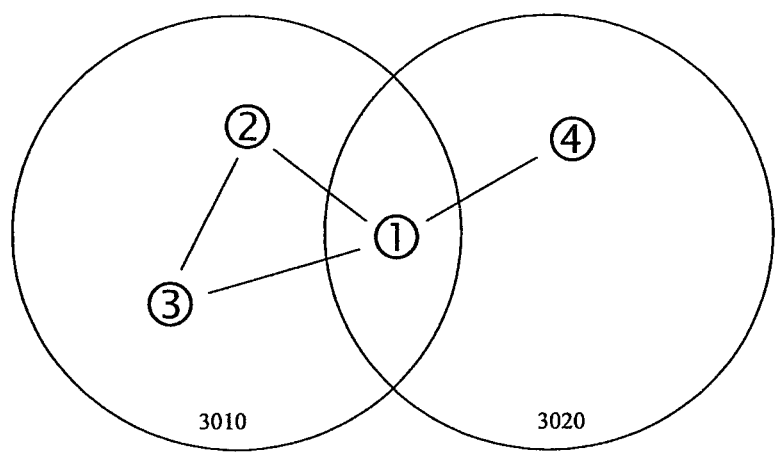
Figure 12:
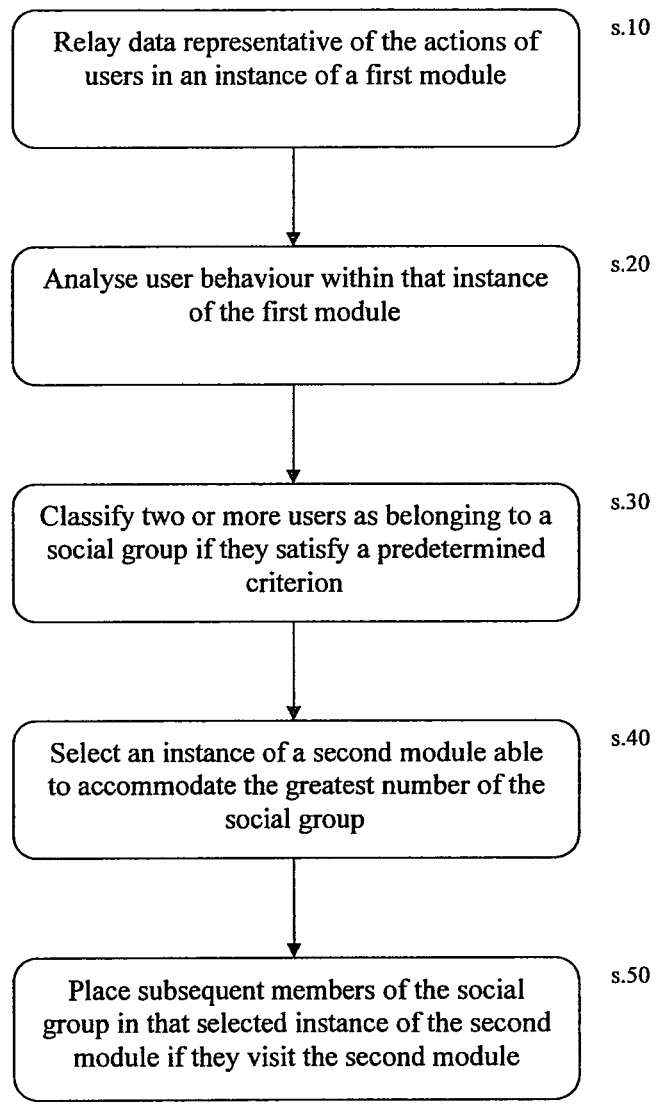
Figure 13:
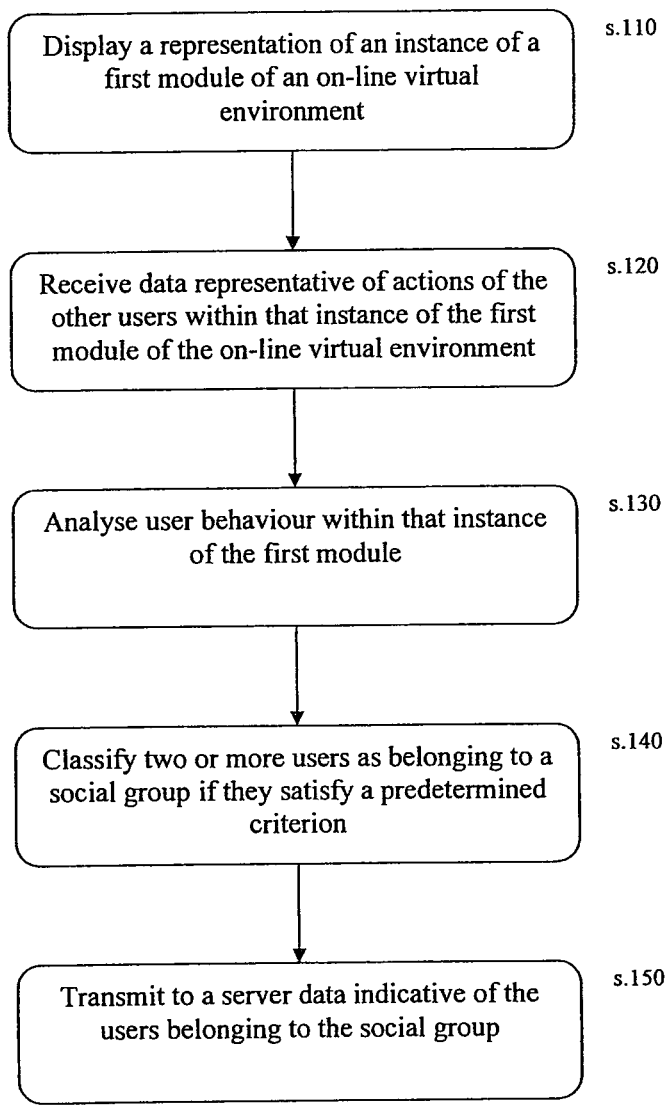

FIGS. 11A, B are schematic diagrams of social groups within a modular on-line environment;

FIG. 12 is a flow diagram of a method of administering a modular on-line environment in accordance with an embodiment of the present invention; and FIG. 13 is a flow diagram of a method of interacting with a modular on-line environment in accordance with an embodiment of the present invention.

An apparatus and method of administering modular online environments are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, a modular virtual environment comprises a plurality of separately realizable zones. Each zone can support a maximum of, for example, 64 users. Therefore to accommodate potentially many tens of thousands of users, multiple instances of each zone are hosted in parallel. A user, interacting with other users in an instance of a first zone, may wish to enter a second zone—for example in order to play a game featured therewith some or all of the other users they were interacting with. The users, each represented by a respective avatar within the virtual environment, walk to an exit that automatically takes them to the second zone. The server that is hosting the modular virtual environment monitors such transitions between zones, and detects that a number of avatars have all left an instance of the first zone within a threshold time period. The server treats these avatars as a potential social group, and identifies an instance of the second zone that has sufficient capacity to accommodate all of these avatars. As a result, the potential social group is not split up by moving between instances of zones within the modular environment.

In the example embodiment, users interact with each other using respective entertainment devices that are connected to the hosting server (and hence the virtual environment) via a network link.

In an embodiment of the present invention the entertainment device is a Sony® Playstation 3® (or 'PS3'®) entertainment device.

Figure 1:
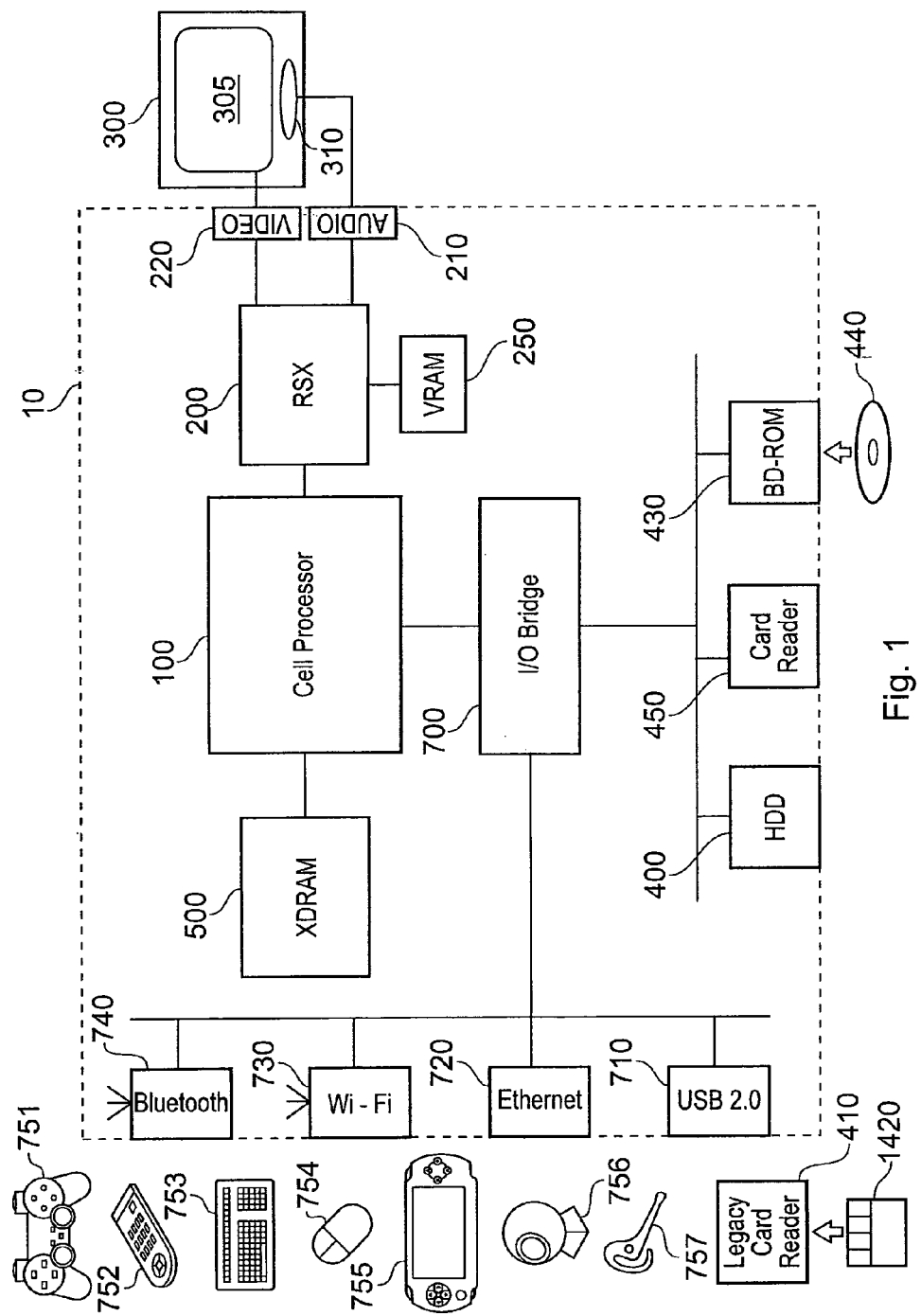
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesizer graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesizer graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
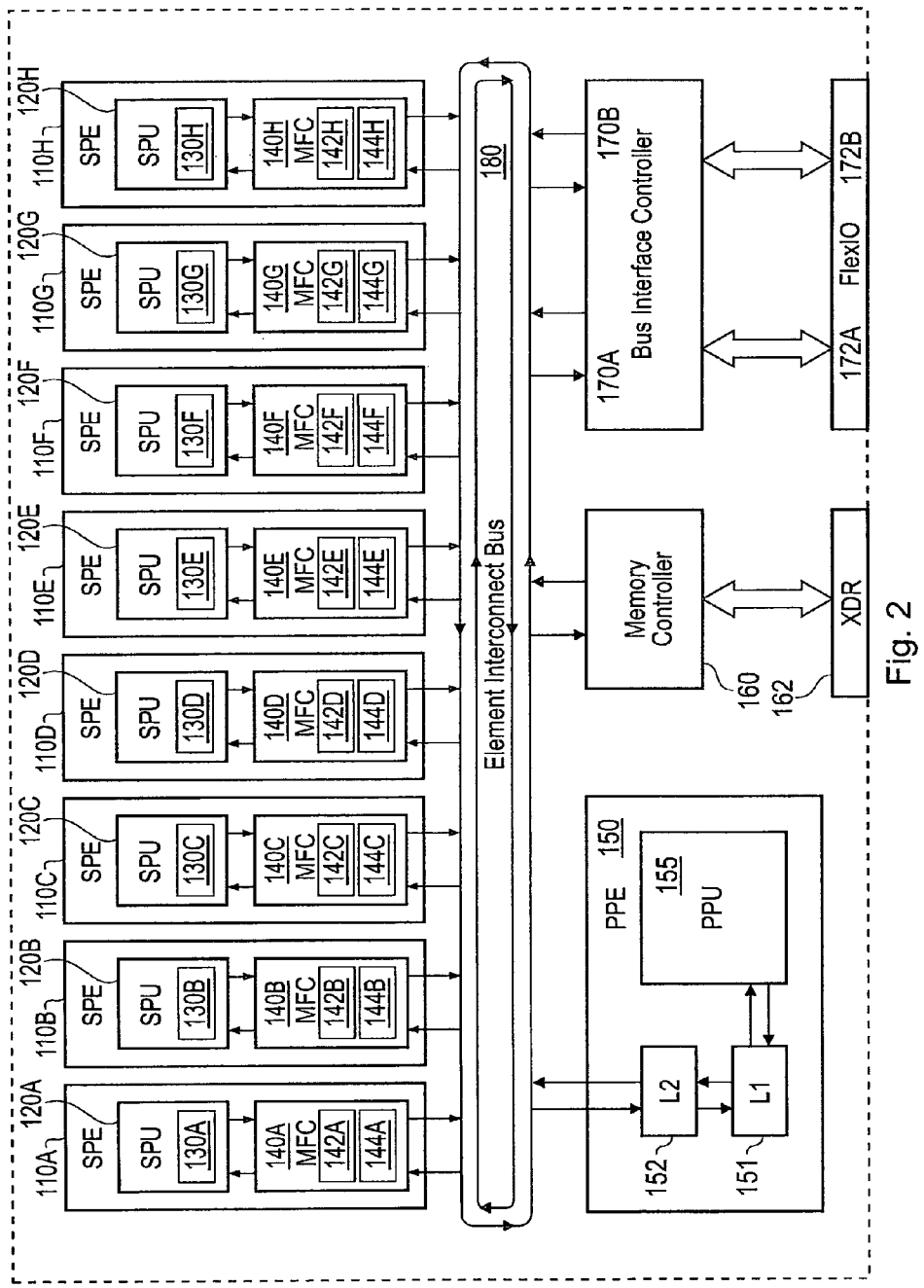
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronies with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totaling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
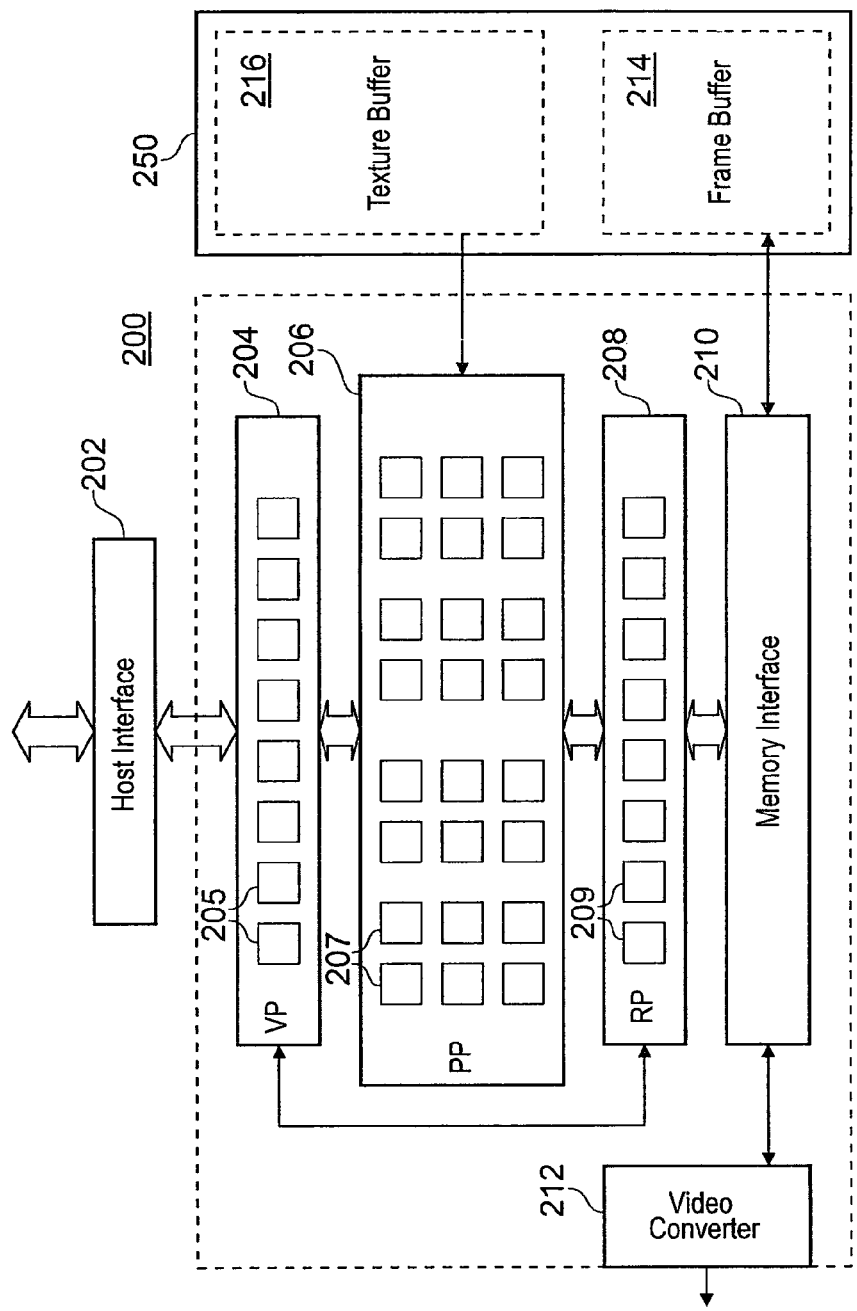
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of color, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centered on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

In an embodiment of the present invention, the above-mentioned online capability comprises interaction with a virtual environment populated by avatars (graphical representations) of the user of the PS3 10 and of other PS3 users who are currently online.

The software to enable the virtual interactive environment is typically resident on the HDD 400, and can be upgraded and/or expanded by software that is downloaded, or stored on optical disk 440, or accessed by any other suitable means. Alternatively, the software may reside on a flash memory card 420, optical disk 440 or a central server (not shown).

In an embodiment of the present invention, the virtual interactive environment (hereafter called the 'Home' environment) is selected from the cross-media bar. The Home environment then starts in a conventional manner similar to a 3D video game by loading and executing control software, loading 3D models and textures into video memory 250, and rendering scenes depicting the Home environment. Alternatively or in addition, the Home environment can be initiated by other programs, such as a separate game.

Figure 4:
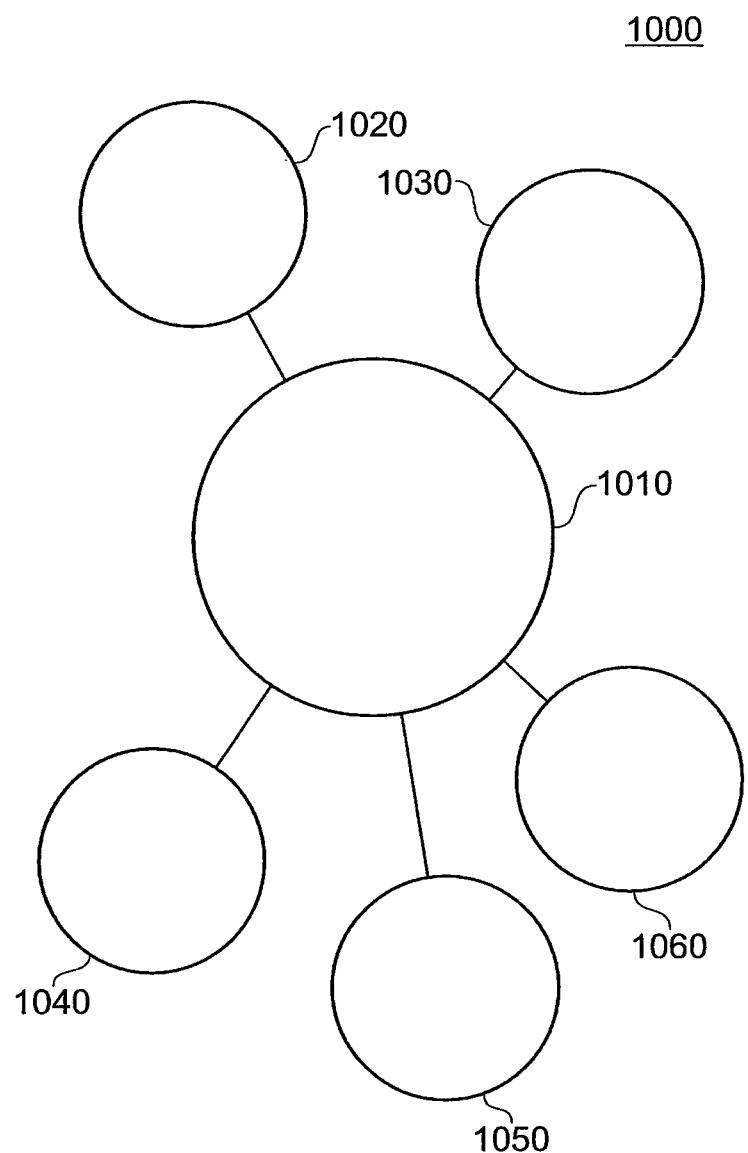
FIG. 4 is a schematic diagram of an interconnected set of game zones in accordance with an embodiment of the present invention.
Figure 5:
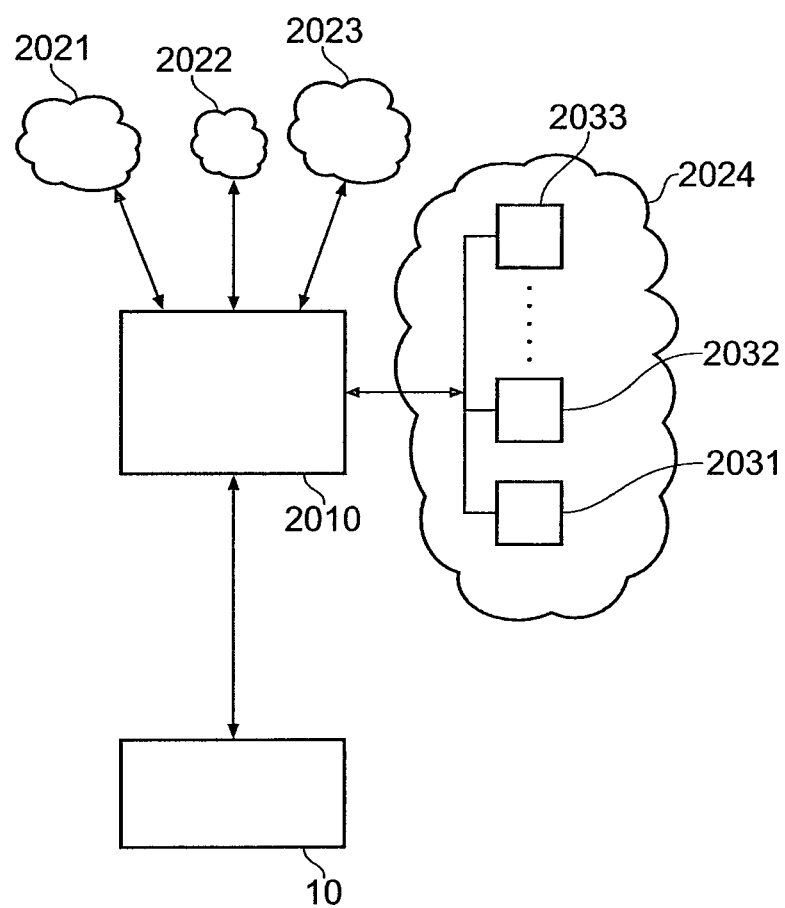
FIG. 5 is a schematic diagram of a Home environment online client/server arrangement in accordance with an embodiment of the present invention.

Referring now to FIG. 4, which displays a notional map of the Home environment, and FIG. 5, which is a schematic diagram of a Home environment online client/server arrangement, the user's avatar is spawned within a lobby zone 1010 by default. However, a user can select among other zones 1010-1060 (detailed below) of the map, causing the selected zone to be loaded and the avatar to be spawned within that zone. In an embodiment of the present invention, the map screen further comprises a sidebar on which the available zones may be listed, together with management tools such as a ranking option, enabling zones to be listed in order of user preference, or such as most recently added and/or A-Z listings. In addition a search interface may allow the user to search for a zone by name. In an embodiment of the present invention, there maybe many more zones available than are locally stored on the user's PS3 at any one time; the local availability may be color coded on the list, or the list may be filtered to only display locally available zones. If the user selects a locally unavailable zone, it can be downloaded from a Home environment Server 2010.

Figure 6A:
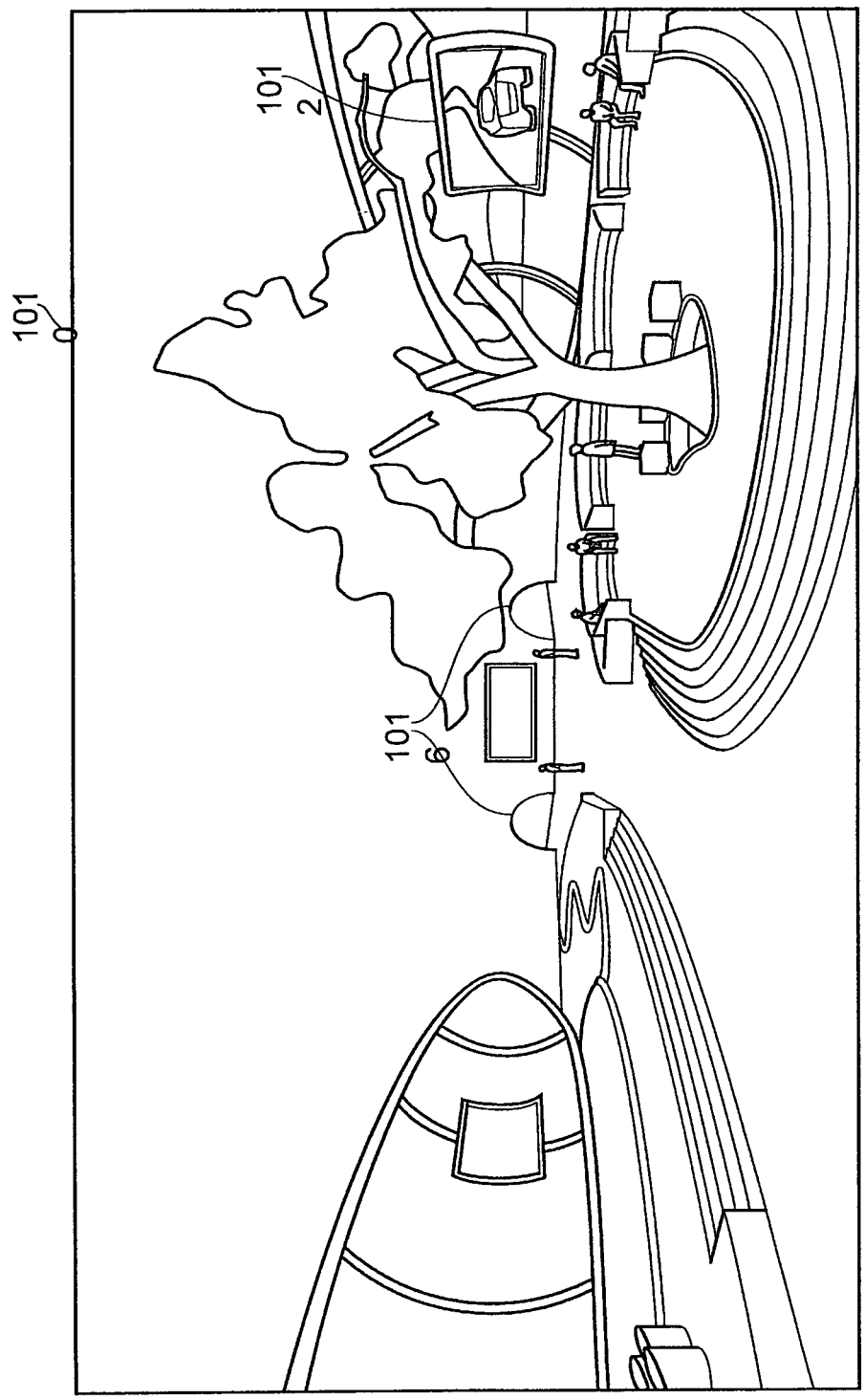
FIG. 6a is a schematic diagram of a lobby zone in accordance with an embodiment of the present invention.

Referring now to FIG. 6a, the lobby zone 1010 typically resembles a covered piazza, and may comprise parkland (grass, trees, sculptures etc.), and gathering spaces (such as open areas, single benches or rows of seats etc.) where users can meet through their avatars.

The lobby zone 1010 typically also comprises advertisement hoardings, for displaying either still or moving adverts for games or other content or products. These may be on the walls of the lobby, or may stand alone.

The lobby zone 1010 may also include an open-air cinema 1012 showing trailers, high-profile adverts or other content from third-party providers. Such content is typically streamed or downloaded from a Home environment server 2010 to which the PS3 10 connects when the Home environment is loaded, as described in more detail later.

The cinema screen is accompanied by seating for avatars in front of it, such that when an avatar sits down, the camera angle perceived by the user of the avatar also encompasses the screen.

Figure 6B:
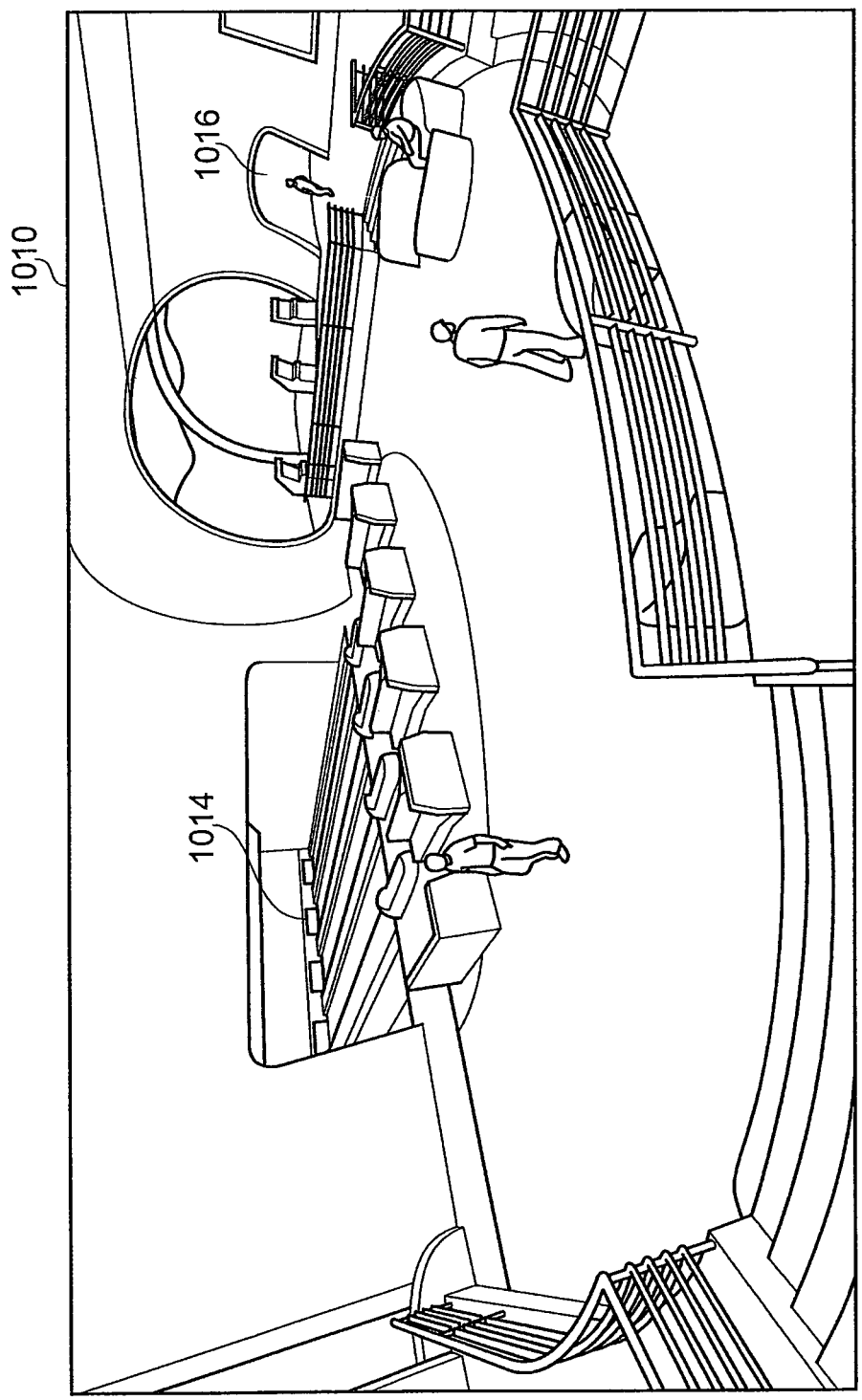
FIG. 6b is a schematic diagram of a lobby zone in accordance with an embodiment of the present invention.

Referring now also to FIG. 6b, the lobby zone 1010 may also include general amusements 1014, such as functioning pool tables, bowling alleys, and/or a video arcade. Games of pool or bowling may be conducted via the avatar, such that the avatar holds the pool cue or bowling ball, and is controlled in a conventional manner for such games. In the video arcade, if an avatar approaches a videogame machine, the Home environment may switch to a substantially full-screen representation of the videogame selected. Such games may, for example, be classic arcade or console games such as Space Invaders®, or Pac-Man®, which are comparatively small in terms of memory and processing and can be emulated by the PS3 within the Home environment or run as plug-ins to the Home environment. In this case, typically the user will control the game directly, without representation by the avatar. The game will switch back to the default Home environment view if the user quits the game, or causes the avatar to move away from the videogame machine. In addition to classic arcade games, user-created game content may be featured on one or more of the virtual video game machines. Such content may be the subject of on-line competitions to be featured in such a manner, with new winning content downloaded on a regular basis.

In addition to the lobby zone 1010, other zones (e.g. zones 1020, 1030, 1040, 1050 and 1060, which may be rooms, areas or other constructs) are available. These may be accessed either via a map screen similar in nature to that of FIG. 4, or alternatively the user can walk to these other areas by guiding their avatar to various exits 1016 from the lobby.

Typically, an exit 1016 takes the form of a tunnel or corridor (but may equally take the form of an anteroom) to the next area. While the avatar is within the tunnel or anteroom, the next zone is loaded into memory. Both the lobby and the next zone contain identical models of the tunnel or anteroom, or the model is a common resource to both. In either case, the user's avatar is relocated from the lobby-based version to the new zone-based version of the tunnel or anteroom at the same position. In this way the user's avatar can apparently walk seamlessly throughout the Home environment, without the need to retain the whole environment in memory at the same time.

Figure 6C:
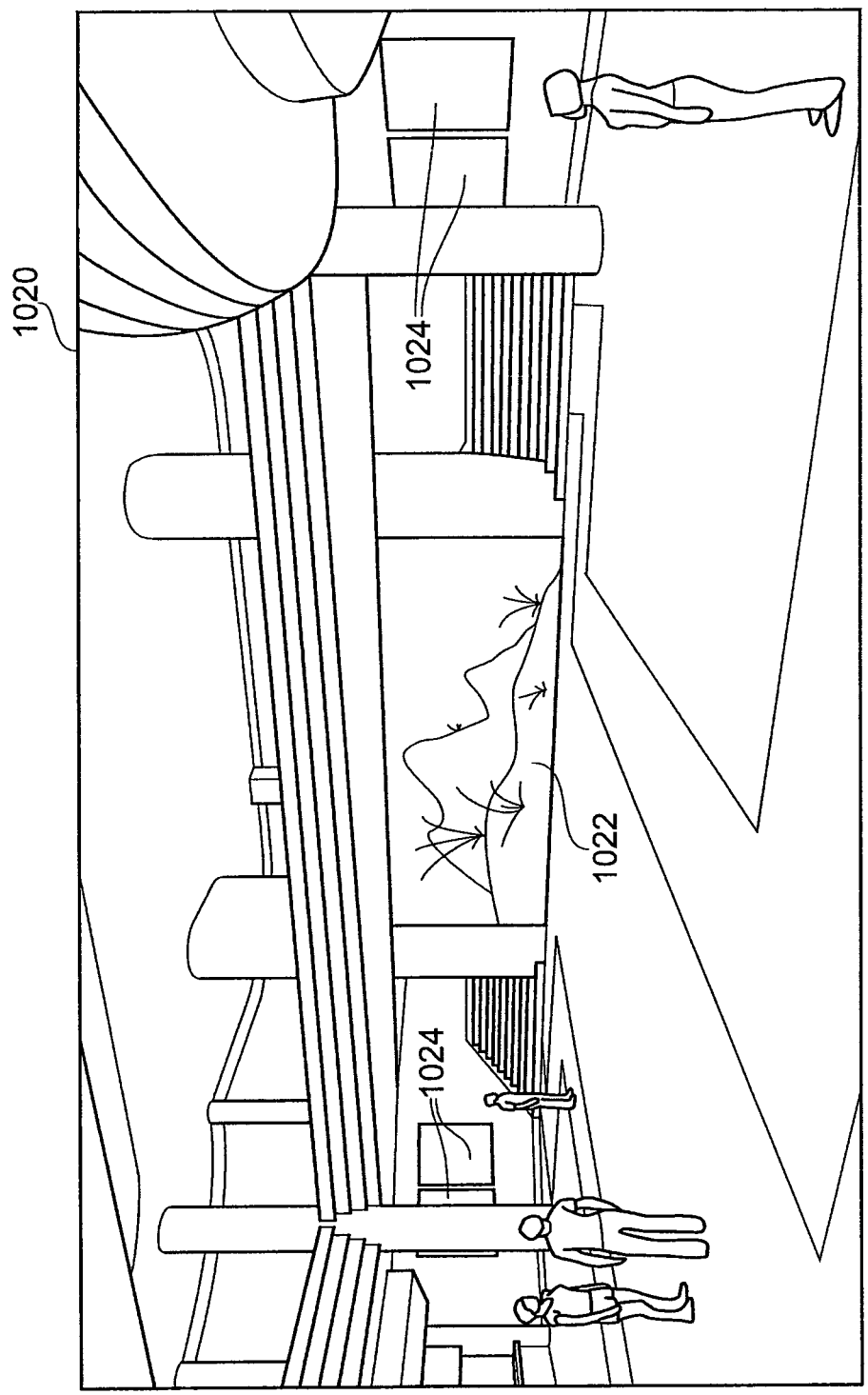
FIG. 6c is a schematic diagram of a cinema zone in accordance with an embodiment of the present invention.

Referring now also to FIG. 6c, one available zone is a Cinema zone 1020. The Cinema zone 1020 resembles a multiplex cinema, comprising a plurality of screens that may show content such as trailers, movies, TV programmes, or adverts downloaded or streamed from a Home environment server 2010 as noted previously and detailed below, or may show content stored on the HDD 400 or on an optical disk 440, such as a Blu-Ray disk.

Typically, the multiplex cinema will have an entrance area featuring a screen 1022 on which high-profile trailers and adverts may be shown to all visitors, together with poster adverts 1024, typically but not limited to featuring upcoming movies. Specific screens and the selection and display of the trailers and posters can each be restricted according to the age of the user, as registered with the PS3. This age restriction can be applied to any displayed content to which an age restriction tag is associated, in any of the zones within the Home environment.

In addition, in an embodiment of the present invention the multiplex cinema provides a number of screen rooms in which featured content is available, and amongst which the user can select. Within a screen room downloaded, streamed or locally stored media can be played within a virtual cinema environment, in which the screen is set in a room with rows of seats, screen curtains, etc. The cinema is potentially available to all users in the Home environment, and so the avatars of other users may also be visible, for example watching commonly streamed material such as a web broadcast. Alternatively, the user can zoom in so that the screen occupies the full viewing area.

Figure 6D:
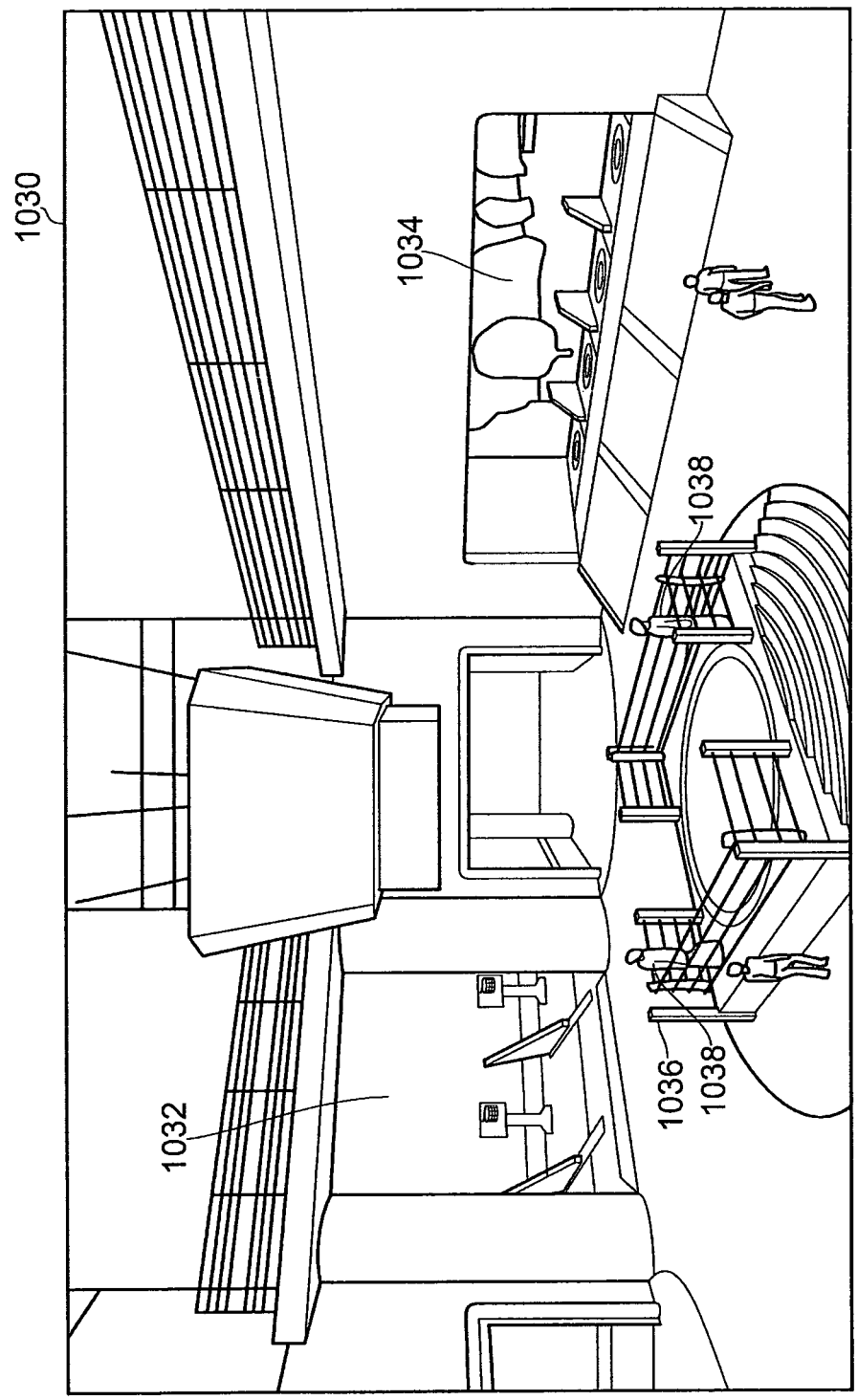
FIG. 6d is a schematic diagram of a developer/publisher zone in accordance with an embodiment of the present invention.

Referring now also to FIG. 6d, another type of zone is a developer or publisher zone 1030. Typically, there may be a plurality of such zones available. Optionally, each may have its own exit from the lobby area 1010, or alternatively some or all may share an exit from the lobby and then have separate exits from within a tunnel or ante-room model common to or replicated by each available zone therein. Alternatively they may be selected from a menu, either in the form of a pop-up menu, or from within the Home environment, such as by selecting from a set of signposts. In these latter cases the connecting tunnel or anteroom will appear to link only to the selected developer or publisher zone 1030. Alternatively or in addition, such zones may be selected via the map screen, resulting in the zone being loaded in to memory, and the avatar re-spawning within the selected zone.

Developer or publisher zones 1030 provide additional virtual environments, which may reflect the look and feel of the developer or publisher's products, brands and marks.

The developer or publisher zones 1030 are supplementary software modules to the Home environment and typically comprise additional 3D models and textures to provide the structure and appearance of the zone.

More generally, it will be appreciated that any zone can be considered as a distinct module within an overall modular Home environment. As noted above, the resources to represent such modules are typically loaded by the PS3 as needed upon entry by the user.

In addition, the software operable to implement the Home environment supports the integration of third party software via an application program interface (API). Therefore, developers can integrate their own functional content within the Home environment of their own zone. This may take the form of any or all of:

i. Downloading/streaming of specific content, such as game trailers or celebrity endorsements;
  ii. Changes in avatar appearance, behavior and/or communication options within the zone;
  iii. The provision of one or more games, such as basketball 1032 or a golf range 1034, optionally branded or graphically reminiscent of the developer's or publisher's games;
  iv. One or more interactive scenes or vignettes representative of the developer's or publisher's games, enabling the player to experience an aspect of the game, hone a specific skill of the game, or familiarize themselves with the controls of a game;
  v. An arena, ring, dojo, court or similar area 1036 in which remotely played games may be represented live by avatars 1038, for spectators to watch.

Thus, for example, a developer's zone resembles a concourse in the developer's signature colors and featuring their logos, onto which open gaming areas, such as soccer nets, or a skeet range for shooting. In addition, a booth (not shown) manned by game-specific characters allows the user's avatar to enter and either temporarily change into the lead character of the game, or zoom into a first person perspective, and enter a further room resembling a scene from the featured game. Here the user interacts with other characters from the game, and plays out a key scene. Returning to the concourse, adverts for the game and other content are displayed on the walls. At the end of the zone, the concourse opens up into an arena where a 5-a-side football match is being played, where the positions of the players and the ball correspond to a game currently being played by a popular group, such as a high-ranking game clan, in another country.

In embodiments of the present invention, developer/publisher zones are available to download. Alternatively or in addition, to reduce bandwidth they may be supplied as demo content on magazine disks, or may be installed/upgraded from disk as part of the installation process for a purchased game of the developer or publisher. In the latter two examples, subsequent purchase or registration of the game may result in further zone content being unlocked or downloaded. In any event, further modifications, and timely advert and trailer media, may be downloaded as required.

A similar zone is the commercial zone 1040. Again, there may be a plurality of such commercial zones accessible in similar manner to the developer and publisher zones. Like developer/publisher zones 1030, commercial zones 1040 may comprise representative virtual assets of one or more commercial vendors in the form of 3D models, textures etc., enabling a rendering of their real-world shops, brands and identities, and these may be geographically and/or thematically grouped within zones.

Space within commercial zones may be rented as so-called 'virtual real-estate' by third parties. For example, a retailer may pay to have a rendering of their shop included within a commercial zone 1040 as part of a periodic update of the Home environment supplied via the Home environment server 2010, for example on a monthly or annual renewal basis. A retailer may additionally pay for the commerce facilities described above, either on a periodic basis or per item. In this way they can provide users of the Home environment with a commercial presence.

Again, the commercial zone comprises supplementary software that can integrate with the home environment via an API, to provide additional communication options (shop-specific names, goods, transaction options etc), and additional functionality, such as accessing an online database of goods and services for purchase, determining current prices, the availability of goods, and delivery options. Such functions may be accessed either via a menu (either as a pop-up or within the Home environment, for example on a wall) or via communication with automated avatars. Communication between avatars is described in more detail later.

It will be appreciated that developers and publishers can also provide stores within commercial zones, and in addition that connecting tunnels between developer/publisher and commercial zones may be provided. For example, a tunnel may link a developer zone to a store that sells the developer's games. Such a tunnel may be of a 'many to one' variety, such that exits from several zones emerge from the same tunnel in-store. In this case, if re-used, typically the tunnel would be arranged to return the user to the previous zone rather than one of the possible others.

In an embodiment of the present invention, the software implementing the Home environment has access to an online-content purchase system provided by the PS3 OS. Developers, publishers and store owners can use this system via an interface to specify the IP address and query text that facilitates their own on-line transaction. Alternatively, the user can allow their PS3 registration details and credit card details to be used directly, such that by selecting a suitably enabled object, game, advert, trailer or movie anywhere within the Home environment, they can select to purchase that item or service. In particular, the Home environment server 2010 can store and optionally validate the user's credit card and other details so that the details are ready to be used in a transaction without the user having to enter them. In this way the Home environment acts as an intermediary in the transaction. Alternatively such details can be stored at the PS3 and validated either by the PS3 or by the Home environment server.

Figure 7:
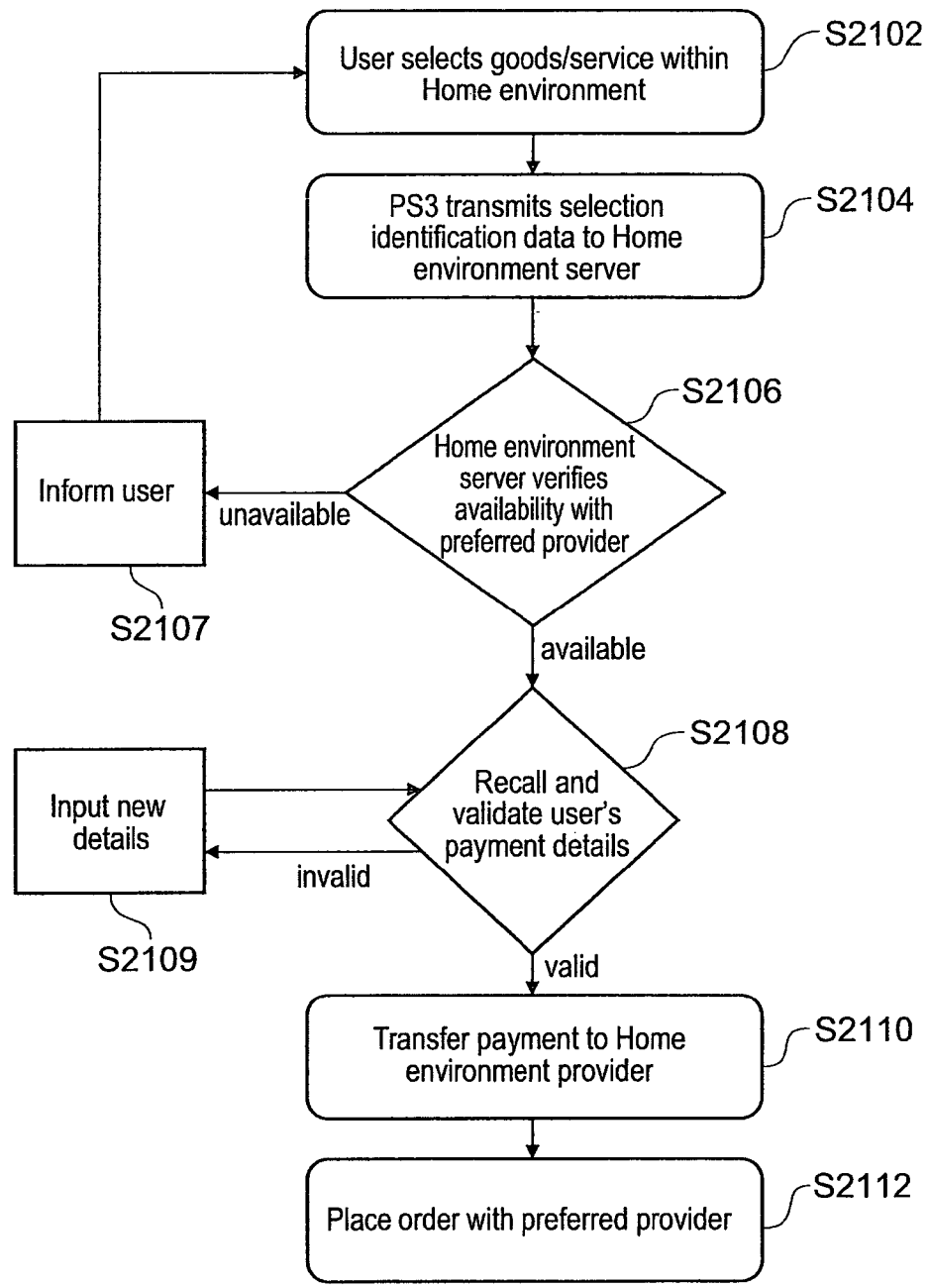
FIG. 7 is a flow diagram of a method of on-line transaction in accordance with an embodiment of the present invention.

Thus, referring now also to FIG. 7, in an embodiment of the present invention a method of sale comprises in a step s2102 a user selecting an item (goods or a service) within the Home environment. In step s2104, the PS3 10 transmits identification data corresponding with the object to the Home environment server 2010, which in step s2016 verifies the item's availability from a preferred provider (preferably within the country corresponding to the IP address of the user). If the item is unavailable then in step s2107 it informs the user by transmitting a message to the user's PS3 10. Alternatively, it first checks for availability from one or more secondary providers, and optionally confirms whether supply from one of these providers is acceptable to the user. In step s2108, the Home environment server retrieves from data storage the user's registered payment details and validates them. If there is no valid payment method available, then the Home environment may request that the user enters new details via a secure (i.e. encrypted) connection. Once a valid payment method is available, then in step s2110 the Home environment server requests from the appropriate third party payment provider a transfer of payment from the user's account. Finally, in s2112 the Home environment server places an order for the item with the preferred provider, giving the user's delivery address or IP address as applicable, and transferring appropriate payment to the preferred provider's account.

In this way, commerce is not limited specifically to shops. Similarly, it is not necessary for shops to provide their own commerce applications if the preferred provider for goods or services when displayed within a shop is set to be that shop's owner. Where the goods or service may be digitally provided, then optionally it is downloaded from the preferred provider directly or via a Home environment server 2010.

In addition to the above public zones, there are additional zones that are private to the individual user and may only be accessed by them or by invitation from them. These zones also have exits from the communal lobby area, but when entered by the avatar (or chosen via the map screen), load a respective version of the zone that is private to that user.

Figure 8A:
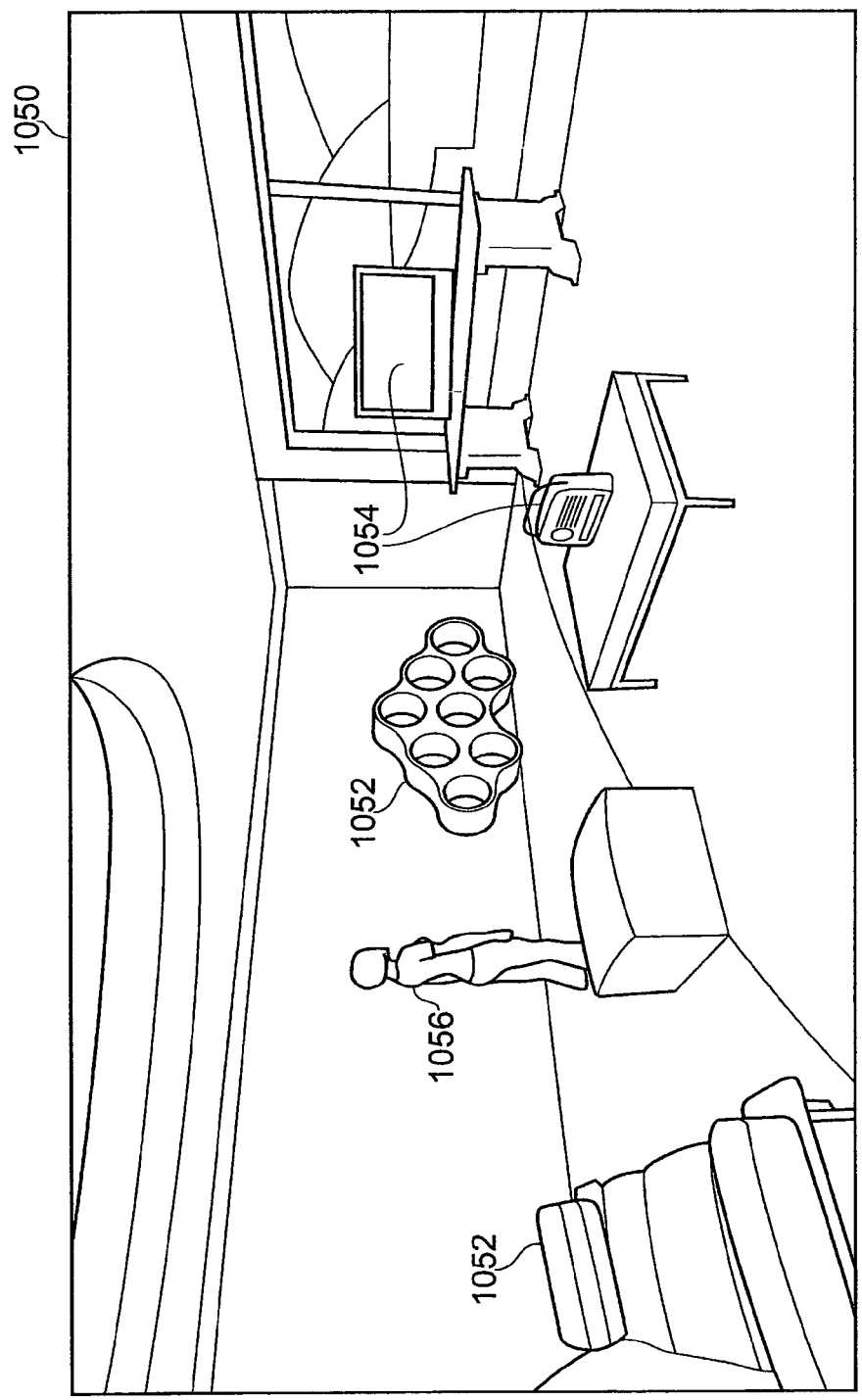
FIG. 8a is schematic diagram of an apartment zone in accordance with an embodiment of the present invention.

Referring to FIG. 8*a*, the first of these zones is an apartment zone 1050. In an embodiment of the present invention, this is a user-customizable zone in which such features 1052 as wallpaper, flooring, pictures, furniture, outside scenery and lighting may be selected and positioned. Some of the furniture is functional furniture 1054, linked to PS3 functionality. For example, a television may be placed in the apartment 1050 on which can be viewed one of several streamed video broadcasts, or media stored on the PS3 HDD 400 or optical disk 440. Similarly, a radio or hi-fi may be selected that contains pre-selected links to internet radio streams. In addition, user artwork or photos may be imported into the room in the form of wall hangings and pictures.

Optionally, the user (represented in FIG. 8*a* by their avatar 1056) may purchase a larger apartment, and/or additional goods such as a larger TV, a pool table, or automated non-player avatars. Other possible items include a gym, swimming pool, or disco area. In these latter cases, additional control software or configuration libraries to provide additional character functionality will integrate with the home environment via the API in a similar fashion to that described for the commercial and developer/publisher zones 1030, 1040 described previously.

Such purchases may be made using credit card details registered with the Home environment server. In return for a payment, the server downloads an authorization key to unlock the relevant item for use within the user's apartment. Alternatively, the 3D model, textures and any software associated with an item may also be downloaded from the Home environment server or an authorized third-party server, optionally again associated with an authorization key. The key may, for example, require correspondence with a firmware digital serial number of the PS3 10, thereby preventing unauthorised distribution.

A user's apartment can only be accessed by others upon invitation from the respective user. This invitation can take the form of a standing invitation for particular friends from within a friends list, or in the form of a single-session pass conferred on another user, and only valid whilst that user remains in the current Home environment session. Such invitations may take the form of an association maintained by a Home environment server 2010, or a digital key supplied between PS3 devices on a peer-to-peer basis that enables confirmation of status as an invitee.

In an embodiment of the present invention invited users can only enter the apartment when the apartment's user is present within the apartment, and are automatically returned to the lobby if the apartment's user leaves. Whilst within the apartment, all communication between the parties present (both user and positional data) is purely peer-to-peer.

The apartment thus also provides a user with the opportunity to share home created content such as artwork, slideshows, audio or video with invited guests, and also to interact with friends without potential interference from other users within the public zones.

When invited guests enter a user's apartment, the configuration of the room and the furnishings within it are transmitted in a peer-to-peer fashion between the attendees using ID codes for each object and positional data. Where a room or item are not held in common between the user and a guest, the model, textures and any code required to implement it on the guest's PS3 may also be transmitted, together with a single-use key or similar constraint, such as use only whilst in the user's apartment and whilst the user and guest remain online in this session.

Figure 8B:
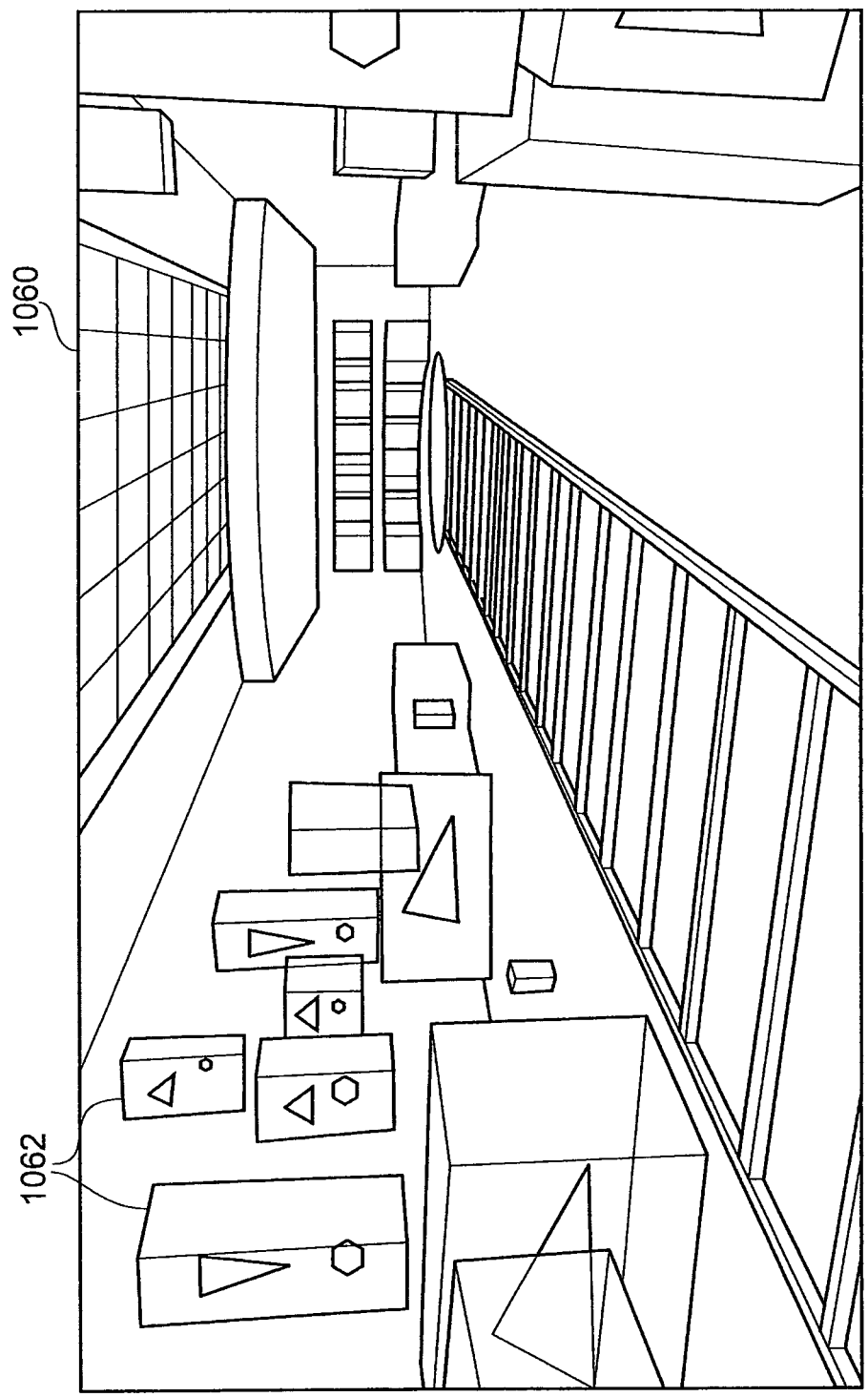
FIG. 8b is schematic diagram of a trophy room zone in accordance with an embodiment of the present invention.

Referring to FIG. 8*b*, a further private space that may similarly be accessed only by invitation is the user's Trophy Room 1060. The Trophy Room 1060 provides a space within which trophies 1062 earned during game play may be displayed.

For example, a third-party game comprises seeking a magical crystal. If the player succeeds in finding the crystal, the third party game nominates this as a trophy for the Trophy Room 1060, and places a 3D model and texture representative of the crystal in a file area accessed by the Home environment software when loading the Trophy Room 1060. The software implementing the Home environment can then render the crystal as a trophy within the Trophy Room.

When parties are invited to view a user's trophy room, the models and textures required to temporarily view the trophies are sent from the user's PS3 to those of the other parties on a peer-to-peer basis. This may be done as a background activity following the initial invitation, in anticipation of entering the trophy room, or may occur when parties enter a connecting tunnel/anteroom or select the user's trophy room from the map screen. Optionally, where another party also has that trophy, they will not download the corresponding trophy from the user they are visiting. Therefore, in an embodiment of the present invention, each trophy comprises an identifying code.

Alternatively or in addition, a trophy room may be shared between members of a group or so-called 'clan', such that a trophy won by any member of the clan is transmitted to other members of the clan on a peer-to-peer basis. Therefore all members of the clan will see a common set of trophies.

Alternatively or in addition, a user can have a standing invitation to all members of the Home environment, allowing anyone to visit their trophy room. As with the commercial and developer/publisher zones, a plurality of rooms is therefore possible, for example a private, a group-based and a public trophy room. This may be managed either by selection from a pop-up menu or signposts within the Home environment as described previously, or by identifying a relevant user by walking up to their avatar, and then selecting to enter their (public) trophy room upon using the trophy room exit from the lobby.

Alternatively or in addition, a public trophy room may be provided. This room may display the trophies of the person in the current instance of the Home environment who has the most trophies or a best overall score according to a trophy value scoring scheme. Alternatively it may be an aggregate trophy room, showing the best, or a selection of, trophies from some or all of the users in that instance of the Home environment, together with the ID of the user. Thus, for example, a user could spot a trophy from a game they are having difficulty with, identify who in the Home environment won it, and then go and talk to them about how they won it. Alternatively, a public trophy room could contain the best trophies across a plurality of Home environments, identifying the best garners within a geographical, age specific or game specific group, or even worldwide. Alternatively or in addition, a leader board of the best scoring garners can be provided and updated live.

It will be appreciated that potentially a large number of additional third party zones may become available, each comprising additional 3D models, textures and control software. As a result a significant amount of space on HDD 400 may become occupied by Home environment zones.

Consequently, in an embodiment of the present invention the number of third party zones currently associated with a user's Home environment can be limited. In a first instance, a maximum memory allocation can be used to prevent additional third party zones being added until an existing one is deleted. Alternatively or in addition, third party zones may be limited according to geographical relevance or user interests (declared on registration or subsequently via an interface with the Home environment server 2010), such that only third party zones relevant to the user by these criteria are downloaded. Under such a system, if a new third party zone becomes available, its relevance to the user is evaluated according to the above criteria, and if it is more relevant than at least one of those currently stored, it replaces the currently least relevant third party zone stored on the user's PS3.

Other criteria for relevance may include interests or installed zones of nominated friends, or the relevance of zones to games or other media that have been played on the user's PS3.

Further zones may be admitted according to whether the user explicitly installs them, either by download or by disk.

As noted above, within the Home environment users are represented by avatars. The software implementing the Home environment enables the customization of a user's avatar from a selection of pre-set options in a similar manner to the customization of the user's apartment. The user may select gender and skin tone, and customize the facial features and hair by combining available options for each. The user may also select from a wide range of clothing. To support this facility, a wide range of 3D models and textures for avatars are provided. In an embodiment of the present invention, user may import their own textures to display on their clothing. Typically, the parameters defining the appearance of each avatar only occupy around 40 bytes, enabling fast distribution via the Home environment server when joining a populated Home environment.

Each avatar in the Home environment can be identified by the user's ID or nickname, displayed in a bubble above the avatar. To limit the proliferation of bubbles, these fade into view when the avatar is close enough that the text it contains could easily be read, or alternatively when the avatar is close enough to interact with and/or is close to the centre of the user's viewpoint.

The avatar is controlled by the user in a conventional third-person gaming manner (e.g. using the game controller 751), allowing them to walk around the Home environment.

Some avatar behavior is contextual; thus for example the option to sit down will only be available when the avatar is close to a seat. Other avatar behavior is available at all times, such as for example the expression of a selected emotion or gesture, or certain communication options. Avatar actions are determined by use of the game controller 751, either directly for actions such as movement, or by the selection of actions via a pop-up menu, summoned by pressing an appropriate key on the game controller 751.

Options available via such a menu include further modification of the avatar's appearance and clothing, and the selection of emotions, gestures and movements. For example, the user can select that their avatar smiles, waves and jumps up and down when the user sees someone they know in the Home environment.

Users can also communicate with each other via their avatars using text or speech.

To communicate by text, in an embodiment of the present invention, messages appear in pop-up bubbles above the relevant avatar, replacing their name bubble if necessary.

Figure 9:
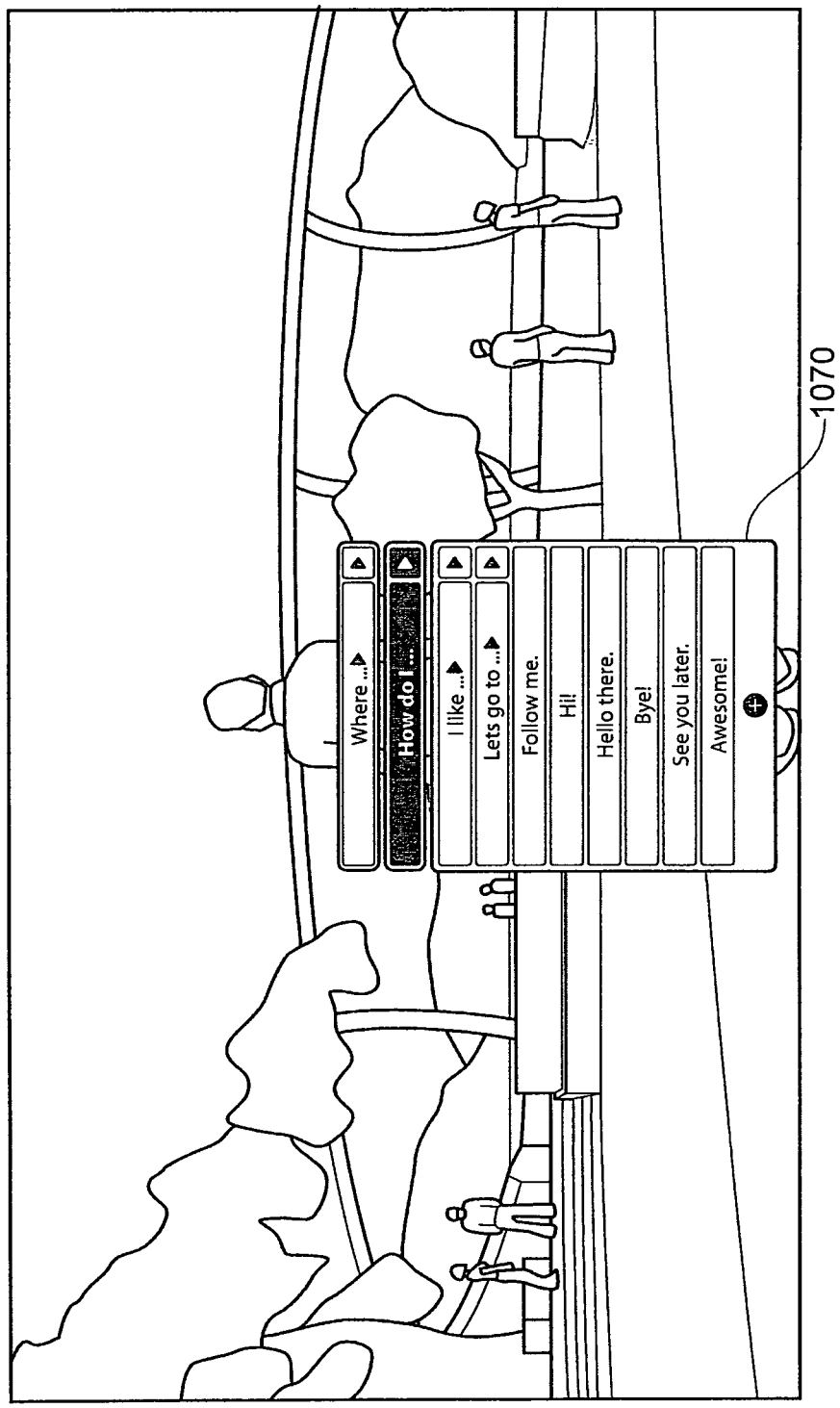
FIG. 9 is a schematic diagram of a communication menu in accordance with an embodiment of the present invention.

Referring now also to FIG. 9, to generate a message the user can activate a pop-up menu 1070 in which a range of preset messages is provided. These may be complete messages, or alternatively or in addition may take the form of nested menus, the navigation of which generates a message by concatenating selected options.

Alternatively or in addition, a virtual keyboard may be displayed, allowing free generation of text by navigation with the game controller 751. If a real keyboard 753 is connected via Bluetooth, then text may by typed into a bubble directly.

In an embodiment of the present invention, the lobby also provides a chat channel hosted by the Home environment server, enabling conventional chat facilities.

To communicate by speech, a user must have a microphone, such as a Bluetooth headset 757, available. Then in an embodiment of the present invention, either by selection of a speech option by pressing a button on the game controller 751, or by use of a voice activity detector within the software implementing the Home environment, the user can speak within the Home environment. When speaking, a speech icon may appear above the head of the avatar for example to alert other users to adjust volume settings if necessary.

The speech is sampled by the user's PS3, encoded using a Code Excited Linear Prediction (CELP) codec (or other known VoIP applicable codec), and transmitted in a peer-to-peer fashion to the eight nearest avatars (optionally provided they are within a preset area within the virtual environment surrounding the user's avatar). Where more than eight other avatars are within the preset area, one or more of the PS3s that received the speech may forward it to other PS3s having respective user avatars within the area that did not receive the speech, in an ad-hoc manner. To co-ordinate this function, in an embodiment of the present invention the PS3 will transmit a speech flag to all PS3s whose avatars are within the preset area, enabling them to place a speech icon above the relevant (speaking) avatars head (enabling their user to identify the speaker more easily) and also to notify the PS3s of a transmission. Each PS3 can determine from the relative positions of the avatars which ones will not receive the speech, and can elect to forward the speech to the PS3 of whichever avatar they are closest to within the virtual environment. Alternatively, the PS3s within the area can ping each other, and whichever PS3 has the lowest lag with a PS3 that has not received the speech can elect to forward it.

It will be appreciated that the limitation to eight is exemplary, and the actual number depends upon such factors as the speech compression ratio and the available bandwidth.

In an embodiment of the present invention, such speech can also be relayed to other networks, such as a mobile telephony network, upon specification of a mobile phone number. This may be achieved either by routing the speech via the Home environment server to a gateway server of the mobile network, or by Bluetooth transmission to the user's own mobile phone. In this latter case, the mobile phone may require middleware (e.g. a Java® applet) to interface with the PS3 and route the call.

Thus a user can contact a person on their phone from within the Home environment. In a similar manner, the user can also send a text message to a person on their mobile phone.

In a similar manner to speech, in an embodiment of the present invention users whose PS3s are equipped with a video camera such as the Sony® Eye Toy® video camera can use a video chat mode, for example via a pop-up screen, or via a TV or similar device within the Home environment, such as a Sony® Playstation Portable® (PSP) held by the avatar. In this case video codecs are used in addition to or instead of the audio codecs.

Optionally, the avatars of users with whom you have spoken recently can be highlighted, and those with whom you have spoken most may be highlighted more prominently, for example by an icon next to their name, or a level of glow around their avatar.

Referring back to FIG. 5, when a user selects to activate the Home environment on their PS3 10, the locally stored software generates the graphical representation of the Home environment, and connects to a Home environment server 2010 that assigns the user to one of a plurality of lobby zones in online Home environments 2021, 2022, 2023, 2024. Only four home environments are shown for clarity.

It will be understood that potentially many tens of thousands of users may be online at any one time. Consequently to prevent overcrowding, the Home environment server 2010 will support a large plurality of separate zones for the online Home environments. Likewise, there may be many separate Home environment servers, for example in different countries.

Once assigned to an instance of a Home environment zone, a PS3 initially uploads information regarding the appearance of the avatar, and then in an ongoing fashion provides the Home environment server with positional data for its own avatar, and receives from the Home environment server the positional data of the other avatars within that instance of the zone in the online Home environment. In practice this positional update is periodic (for example every 2 seconds) to limit bandwidth, so other PS3s must interpolate movement. Such interpolation of character movement is well-known in on-line games. In addition, each update can provide a series of positions, improving the replication of movement (with some lag), or improving the extrapolation of current movement.

In addition the IP addresses of the other PS3s 2031, 2032, 2033 interacting within that instance is shared so that they can transmit other data such as speech in a peer-to-peer fashion between themselves, thereby reducing the required bandwidth of data handled by the Home environment server.

To prevent overcrowding within the Home environments, each instance of a zone will support a maximum of, for example, 64 users.

The selection of an instance of a Home environment zone to which a user will be connected can take account of a number of factors, either supplied by the PS3 and/or known to the Home environment server via a registration process. These include but are not limited to:
  i. The geographical location of the PS3;
  ii. The user's preferred language;
  iii. The user's age;
  iv. Whether any users within the current user's 'friends list' are in a particular instance of a Home environment zone already;
  v. What game disk is currently within the user's PS3;
  vi. What games have recently been played on the user's PS3.

Thus, for example, a Swiss teenager may be connected to an instance of a Home environment zone on a Swiss server, with a maximum user age of 16 and a predominant language of French. In another example, a user with a copy of 'Revolution' mounted in their PS3 may be connected to an instance of a Home environment zone where a predominant number of other users also currently have the same game mounted, thereby facilitating the organization of multiplayer games. In this latter case, the PS3 10 detects the game loaded within the BD-ROM 430 and informs the Home environment server 2010. The server then chooses an instance of a Home environment zone accordingly.

In a further example, a user is connected to an instance of a Home environment zone in which three users identified on his friends list can be found. In this latter example, the friends list is a list of user names and optionally IP addresses that have been received from other users that the user given wishes to meet regularly. Where different groups of friends are located on different Home environment servers (e.g. where the current user is the only friend common to both sets) then the user may either be connected to the one with the most friends, or given the option to choose.

Conversely, a user may invite one or more friends to switch between Home environments and join them. In this case, the user can view their friends list via a pop-up menu or from within the Home environment (for example via a screen on the wall or an information booth) and determine who is on-line. The user may then broadcast an invite to their friends, either using a peer-to-peer connection or, if the friend is within a Home environment or the IP address is unknown, via the Home environment server. The friend can then accept or decline the invitation to join.

To facilitate invitation, generally a Home environment server will assign less than the maximum supported number of users to a specific home environment, thereby allowing such additional user-initiated assignments to occur. This so-called 'soft-limit' may, for example, be 90% of capacity, and may be adaptive, for example changing in the early evening or at weekends where people are more likely to meet up with friends on-line.

Where several friends from a user's friends list are within the same Home environment, in an embodiment of the present invention the map screen may also highlight those zones in which the friends can currently be found, either by displaying their name on the map or in association with the zone name on the side bar.

Figure 10:
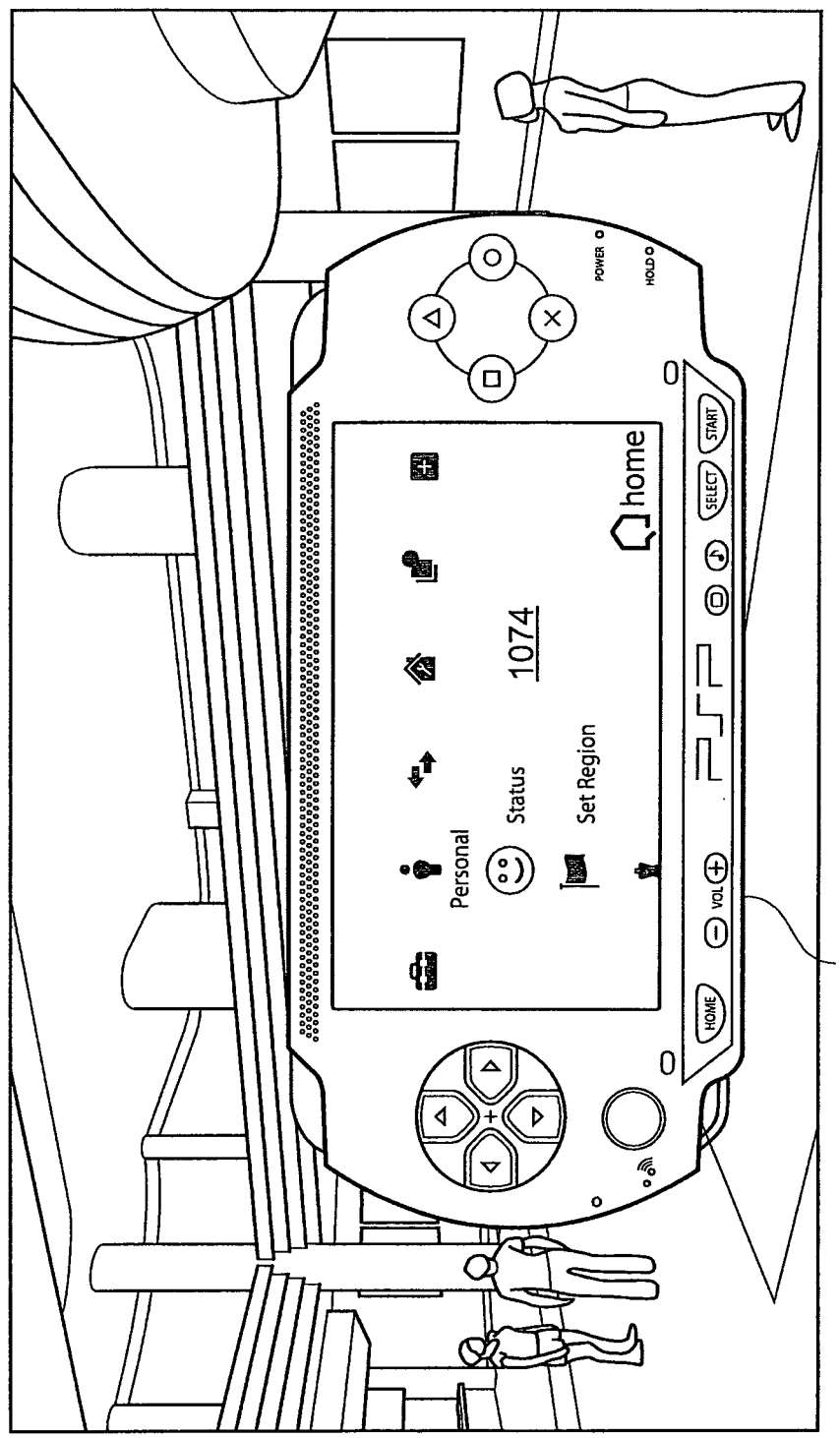
FIG. 10 is a schematic diagram of an interactive virtual user device in accordance with an embodiment of the present invention.

Referring now also to FIG. 10, in addition, preferences, settings, functions of the Home environment and optionally other functionality may be viewed, adjusted or accessed as appropriate by use of a virtual Sony® Playstation Portable® (PSP) entertainment device 1072 that can be summoned by use of the game controller 751 to pop-up on screen. The user can then access these options, settings and functionality via a PSP cross-media bar 1074 displayed on the virtual PSP. As noted above, the PSP could also be used as an interface for video chat.

When a user wishes to leave the Home environment, in embodiments of the present invention they may do so-by selection of an appropriate key on the game controller 751, by selection of an exit option from a pop-up menu, by selection of an exit from within the map screen, by selection of an option via their virtual PSP or by walking through a master exit within the lobby zone.

Typically, exiting the Home environment will cause the PS3 10 to return to the PS3 cross media bar.

Finally, it will be appreciated that additional, separate environments based upon the Home environment software and separately accessible from the PS3 cross-media bar are envisaged. For example, a supermarket may provide a free disk upon which a Supermarket environment, supported in similar fashion by the Home environment servers, is provided. Upon selection, the user's avatar can browse displayed goods within a virtual rendition of the supermarket (either as 3D models or textures applied to shelves) and click on them to purchase as described above. In this way retailers can provide and update online shopping facilities for their own user base.

It will be appreciated that since any single instance of a zone of the Home environment has a maximum capacity of say, 64 people, then a monolithic implementation of the Home environment in which instances of each zone within the environment are exclusively associated with that monolithic instance of the Home environment (and hence, where they interlink, exclusively with each other) would only allow 64 people to occupy each such a monolithic instance of the Home environment, since this is the maximum population supported by any one zone within it. However, as the Home environment expands to incorporate more and more zones, this population of 64 people will become ever more sparse, and social interaction between them becomes more difficult.

As a result, preferably the Home environment is not constructed in this monolithic fashion, but rather is constructed from non-exclusive instances of each zone. As a result, there is a many-to-many relationship between instances of interconnected zones; for example, when a user moves from an instance of the lobby zone to an instance of a developer zone, that instance of the developer zone is not exclusively associated with the instance of the lobby zone that the user has just left, and vice versa. Consequently users from many instances of the lobby may arrive in one instance of a developer zone, and conversely users from many instances of a developer zone (or any other) may arrive in one instance of the lobby.

By implementing the Home environment in this way using non-exclusive zones, any given instance of a zone can be kept well populated, with the number of instances of each zone preferably being dynamically adjusted according to demand in order maintain a reasonable average population per instance. As a result, however, there is no longer strictly a single, monolithic 'instance' of a complete Home environment.

To maintain some consistency for the user, therefore, in an embodiment of the present invention the instances of zones that a user visits during an online session are recorded either by the Home environment server 2010 or the PS3 10, so that when a user revisits a zone they are returned to the same instance where possible.

The caveat of 'where possible' arises because on occasion a particular instance of a zone may in the meantime have reached a population level at or above its so-called 'soft limit', preventing re-entry as mentioned previously. In this case, however, optionally the soft limit may be exceeded in order to allow a user to return. In turn this exception may optionally be subject to a second, 'hard' limit below the capacity limit, thereby still allowing entry by moderators or other higher-priority users.

This problem of limited capacity in any given zone also affects ad-hoc social groupings of users as they traverse the many-to-many associations of zone instances within the modular home environment.

For example, if a group of five users meet for the first time in the cinema zone and subsequently decide to go bowling together in the lobby zone, then for example the first two to transfer are simply assigned to the next available instance of the lobby zone. If as a result that instance reaches its soft limit, the remaining three will be sent to another instance of the lobby zone, thereby splitting up the group. Consequently a mechanism is needed to ensure or at least improve the likelihood that all five users will be transferred to an instance of the lobby (or any other zone they wish) that has sufficient capacity below its soft limit to accommodate them together.

This mechanism therefore requires two elements; a means to identify the five users as a potential social group that is to be preserved between zones where possible, and a means to select an appropriate instance of a zone when one or more of those users choose to move.

In embodiments of the present invention, means to identify social groups can be implemented either by the Home environment server or by the PS3s of one or more users themselves. The selection of an instance of a zone can then be determined by the Home environment server dependent upon its own identifications of social groups or those communicated to it by one or more PS3s of users.

Thus in an embodiment of the present invention, the Home environment server, in addition to relaying data about the actions of the users between PS3s within an instance of a zone of the modular Home environment, also analyses the actions (i.e. the behavior) of the users to identify potential social groups. Users are classified as members of such a common social group if they satisfy a social criterion evaluated by the Home environment server.

In another embodiment of the present invention, a user's PS3, in addition to transmitting information about the actions of its user and receiving information about the actions of others within an instance of a zone of the modular Home environment, also analyses the actions (i.e. the behavior) of the users to identify potential social groups. Users are classified as members of such a common social group if they satisfy a social criterion evaluated by the PS3. The PS3 then transmits data indicating the members of this group to the Home environment server and optionally the PS3s of the identified members.

Such a social groupings can be maintained either until further user actions fulfill a further social criterion, or until a time limit for the social group runs out.

In the case of either the PS3 or the Home environment server analyzing user actions, the criterion used to classify users as part of a social group can include whether two or more users both use an exit to another zone within a predetermined time period. This can be taken as indicative that the two or more users intended to leave together. Optionally, in order to limit the delay experienced by the first user to exit the zone (when waiting to determine if another user is following within the predetermined time period before assigning a common instance of the new zone), the criterion can be reformulated to include whether two or more users enter a region associated with (e.g. adjacent to) an exit within a predetermined period; for example, the tunnels or anterooms of exits discussed previously. It will be appreciated that this second formulation is preferable for use by a PS3 whose user was the first to exit the current zone.

Alternatively or in addition, the criterion can optionally include whether two or more users remain within a predetermined distance of each other for a predetermined time period. This is indicative of the users engaging in conversation (e.g. via peer-to-peer audio link, which may be undetectable to the Home environment server) or that the users have some experience in common—for example, both are watching the same movie trailer or TV programme in the cinema zone.

Similarly, the criterion can optionally include whether two or more users communicated with each other (for example, using the text message facility disclosed previously) within a predetermined period of time prior to at least one of them moving to another zone. The comparatively strong social indication of such a conversation may justify a longer time limit for maintaining such a social group than, for example, the possibly coincidental exit of two users within a relatively short period of time. Optionally, communication via a peer-to-peer method can be indicated by the PS3 to the Home environment server for this purpose.

Alternatively or in addition the criterion can optionally include whether at least one of two or more users use one of a predetermined list of keywords during communications with the other of the two or more users. Such keywords may include 'meet', 'follow', 'come', the names of any of the zones and various terms of assent or flattery. These can be considered strong indicators of the desire to form a social group and so the association of the users as a social group can be maintained for a comparatively long period of time.

Again the criterion can also optionally include whether at least one of two or more users direct their avatar to perform one of a predetermined list of actions within a predetermined distance of the other of the two or more users. For example, a choice to wave, smile or give a thumbs up may be taken as an indicator of a desire to be friends with another user, and the instigator of the gesture and the users whose avatars were within a certain distance in front of the user's avatar at the time of the gesture can be associated as a social group.

Alternatively or in addition the criterion can optionally include whether two or more users simultaneously interact with an aspect of the Home environment, for example by both using a bowling alley, or playing pool, table tennis games or similar within the Home environment.

It will be appreciated that a user can also be removed from a presumed social group if their actions suggest they are not in fact inclined to form a social bond with other users in the group. Such removal does not preclude the user rejoining the group if they again satisfy a criterion for doing so.

For example, a user may be deselected from a social group if that user does not use an exit to another zone for a predetermined period of time after at least one other member of the common social group has done so.

Likewise, optionally a user may be deselected from a social group if they do not remain, for a first predetermined period of time, within a predetermined distance of a member of the common social group, during a second predetermined period of time.

Similarly, optionally a user may be deselected from a social group if they do not communicate with a member of the common social group for a predetermined period of time.

Alternatively or in addition a user may optionally be deselected from a social group if they use one of a predetermined list of keywords during communications with one or more of the members of the common social group, where the keywords are negative or antisocial, such as 'go away' or 'I don't like you'.

Again, a user may optionally be deselected from a social group if they direct their avatar to perform one of a predetermined list of actions, where the actions are antisocial—for example walking away from a member of the social group whilst that member is talking to the user.

In an embodiment of the present invention, in the event that the member of a social group exits an instance of one zone to enter another zone (here, a 'social group' may be a group formed after the event in response to one or more other users also leaving shortly thereafter as discussed above), the Home environment server is operable to select an instance of the target zone that has sufficient capacity to accommodate all of the members of the group.

Where several instances exist with sufficient capacity, optionally the Home environment server selects one with sufficient capacity that if the additional members of the social group all join, the total population will still be below a soft limit that is less than the maximum possible population.

Where no instances exist with sufficient capacity, the instance that would accommodate the greatest number of members of the social group is selected. Alternatively, in this case the Home environment server could generate a new instance of the target zone and place the user there. However this is less preferable as this first member of the social group to leave the previous zone may then find themselves alone in that instance for some period of time, depending on the criterion used to determine a social group as listed above.

More generally, as a minimum requirement the Home environment server could select an available instance that would simply accommodate one or more further members of the social group, on the assumption that the first person to follow a user is the one the user is most likely to want to see again.

Optionally, places for users within an instance of a zone can be reserved by the Home environment server for other members of a social group for a predetermined period of time, effectively lowering the 'soft limit' used in that instance of the zone when determining the allocation of other users who are not members of the social group.

In any event, unless a member of the social group then behaves in such a manner as to disqualify themselves from the group as disclosed previously, or optionally until a time limit for the social group as a whole runs out, that member of the social group will be transferred by the Home environment server to the same instance of the target zone as the first member, if they also exit the current zone to visit the same zone as the first member.

In an embodiment of the present invention, a user also has the option to review the social groups they have been associated with, and to explicitly remove themselves from such groups, or from any groups containing a certain individual.

In this way, ad-hoc social groups that are not formalized through the use of so-called 'friends lists' or similar can be maintained within a modular on-line environment comprising parallel instances of each module (i.e. each zone), where each has a many-to-many association.

It will be appreciated that a user may interact with several different sets of users within an instance of a zone, and so become a member of several social groups. In this case, there may be a conflict where the user follows members of both groups to another zone. In this case, the Home environment server may select which group to use for the purposes of selecting an instance of the target zone, by evaluating one or more parameters associated with the criteria used to classify the user as a member of each group.

Variously, these parameters may take the form of a hierarchy of the behaviors analyzed (for example, use of keywords like 'follow me' take precedence over standing next to someone for two minutes, when choosing between the resulting social groups). Alternatively or in addition an evaluated parameter for comparative purposes may be for example the duration that users stood next to each other, or the time difference between using an exit. Such parameters may be compared to determine the relative preference of one social group over another to the user.

Referring now to FIGS. 11A and B, in an instance of a zone within the Home environment, as an example a user 1 has acted with respect to three other users 2, 3 and 4 in such a way that two social groups 3010, 3020 have been formed.

In FIG. 11A, the user 1 joined a bowling game in which two other users 2, 3 were already engaged, such that all three were playing together for 5 minutes. All three users communicated with each other during the game, but have not communicated since. Ten minutes have elapsed since the end of the bowling game.

For this latter ten minute period, the user has stood next to a further other user 4 (i.e. moved his avatar next to the further other users avatar) whilst both watched a cartoon on a screen within the zone, but has not spoken with that further other user during this time.

Exemplary valuations of the two social groups may then be as follows:

The first group 3010 satisfies criteria relating to communication between members of the group, and to sharing a common interactive component of the environment. The amount (and optionally the nature) of communication between the users, and the duration of play with the bowling alley, can be used to generate a quantitative score for the first group. Optionally, this score is then discounted over time, and hence the time limit for the social group is responsive to the nature of the actions that instigated it, and can be refreshed by further relevant activity. In the illustrated case, the value of the first group has reduced by 50% over the last 10 minutes. It will be appreciated that a fixed time limit is also possible.

The second group 3020 satisfies the criterion of two avatars remaining within a threshold proximity for more than, say, three minutes. In this case, the actual duration can be used to generate a quantitative score for the second group.

If a member of each group were to independently exit the current zone to visit another, second zone, there is no guarantee that they would be sent to the same instance of that second zone. Therefore if the user 1 were to subsequently also exit to visit that same zone, then it would be necessary to decide which member of which group the user should follow. In this case, for the sake of example the first group score is greater than the second group score and so the user follows the member of the first group, from the bowling alley.

However, if the user and the further other user 4 watched the cartoon for fifteen minutes instead of ten, then the relative scores in the example case (due to the further discount of the score for the first group 3010 and the greater score for the duration of time spent in the second group 3020) would mean then when the user eventually followed the others to the second zone, the user would follow the further other user 4 of the second group 3020, with whom they had watched the cartoon.

Other quantitative factors can be included in such an evaluation. For example, how many members of a group have already moved to the second zone may influence the evaluation, since just because one member of a potentially high scoring social group in the current zone has moved to a second zone this does not guarantee migration of the rest of the group, whereas a lower scoring group of whom half a dozen members have already moved to the zone that the user wishes to visit is indicative of a stronger social group in the second zone which the user can then join. Therefore in an embodiment of the present invention, social groups are evaluated for a given user responsive to their current composition in the second zone.

Figure 11B:
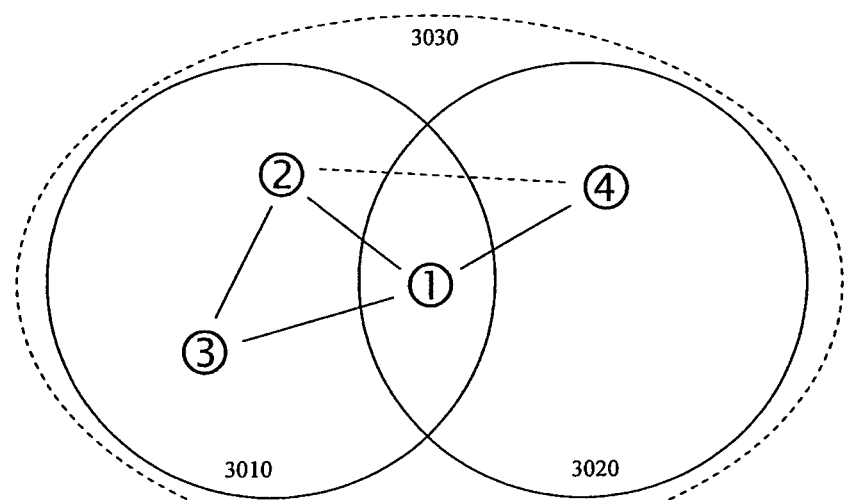

Referring now also to FIG. 11B, two social groups can coalesce to form a supra social group 3030 if two or more members of each respective group interact. Alternatively, individual members of a group can add further users to that group through their actions. Optionally in this case the thresholds to satisfy the social criterion (e.g. duration of close proximity, set of keywords used) can be made more restrictive to prevent rapid expansion of groups.

As noted previously, the selection of an instance of a zone for a single user can factor in user-based details such as language, age, declared preferences, and the game currently mounted in the user's PS3, etc. In a similar fashion, average user-based details can be derived from a social group in order to place it in a more suitable instance of a zone, if there is a choice available.

For example, the majority language within the group can be a factor, as can the age of the youngest member of the group. A summation of preference details may also be used, as may the most commonly mounted game amongst members of a group.

It will be appreciated that in addition to social groups classified as described previously, the selection of instances of zones as described herein can also be applied where users have explicitly declared friendships, for example as recorded in a so-called 'friends list'. In this case, in an embodiment of the present invention, a behavior that triggers the classification of two or more users as part of a social group is where one user consults their 'friends list', and issues an invite to a friend to join them in their instance of a zone. If the friend accepts, then they are both are classified as belonging to a common social group for the purposes of subsequent movement between zones in the manner described herein. Chains or networks of friends that accumulate in this manner during an on-line session can all be classified within the same social group.

Referring now to FIG. 12, for a modular on-line virtual environment where each module (i.e., each zone) of the on-line virtual environment has a plurality of parallel instances each able to host a limited number of users, a method of administering it comprises:

in a first step, receiving (s.10) data representative of the actions of users within an instance of a first module of the modular on-line virtual environment, and transmitting to each user within that instance of that module data representative of the actions of each other user within that instance of that module;

in a second step, analyzing (s.20) user behavior within that instance of the first module, and in which:

in a third step, if the behavior of two or more users satisfies a predetermined criterion, then classifying (s.30) the two or more users as belonging to a social group comprising the two or more users;

in a fourth step selecting (s.40) an instance of a second module that has the capacity to accommodate one or more further members of the social group when one member of that social group moves within the modular on-line virtual environment from the first module to the second module; and in a fifth step, if a subsequent respective user, classified as a member of the same social group as the first user, moves within the modular on-line virtual environment from the first module to the second module, placing (s.50) that subsequent respective user in the same selected instance of the second module as the first user, Referring now to FIG. 13, for a modular on-line virtual environment where each module (i.e., each zone) of the on-line virtual environment has a plurality of parallel instances each able to host interactions between a user of an entertainment device and a limited number other users of one or more remote entertainment devices, a method of interacting with it comprises:

In a first step, displaying (s.110) a representation of an instance of a first module of the on-line virtual environment;

In a second step, receiving (s.120) data representative of the actions of the other users within that instance of the first module of the on-line virtual environment;

In a third step, analyzing (s.130) user behavior within that instance of the first module, in which In a fourth step, if the behavior of the user of the entertainment device and one or more other users of respective remote entertainment devices satisfies a predetermined criterion then these two or more users are classified (s1.40) as belonging to a social group comprising the two or more users; and In a fifth step, transmitting (s150) to a server administering that instance of the first module of the on-line virtual environment, data indicative of the users belonging to the social group.

It will be apparent to a person skilled in the art that variations in the above methods corresponding to operation of the various embodiments of the apparatus disclosed above are considered within the scope of the present invention, including as applicable but not limited to:

- the incorporation of various elements of a social grouping selection criterion as listed herein;
- the incorporation of various elements of a social grouping de-selection criterion as listed herein;
- selection amongst conflicting social groups to which a user belongs;
- selection where possible of an instance of a zone that leaves enough room to maintain a soft limit even after all members of the social group have joined; and
- selection where possible of an instance of a zone according to a group property such as majority language, geography, or averaged user preferences.

It will be appreciated that embodiments of the present invention can be implemented on a server or an entertainment device such as a PS3 as applicable in any suitable manner, including by adaptation of the existing operation of a server or PS3.

In this instance, the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realized in hardware as an ASIC (application specific integrated circuit) or an FPGA (field programmable gate array) or other configurable circuit suitable to use in adapting the conventional equivalent device.

The invention claimed is:

1. A server arranged to administer a modular on-line virtual environment, each on-line module of the on-line virtual environment having a plurality of parallel instances each having a capacity to host a limited number of users, the server comprising:
    a network communications arrangement operable to receive data representative of actions of users within an instance of the plurality of instances of a first on-line module of the modular on-line virtual environment, and to transmit to each of the users within the instance of the first on-line module data representative of the actions of each other user within the instance of the first on-line module;
    a behaviour analyzer operable to analyse user behaviour within the instance of the first on-line module, in which if the behaviour of two or more users satisfies a predetermined criterion then the two or more users are classified as belonging to a social group comprising the two or more users;
    a module instance selector operable to select an instance of a second on-line module for one of the users when said one of the users moves within the modular on-line virtual environment from the first on-line module to the second on-line module, in which
    the module instance selector is operable to select the instance of the second on-line module that has a capacity to accommodate one or more further members of the social group so that if said one of the users and the one or more further members of the social group join that instance of the second on-line module, the number of users of that instance of the second on-line module will not exceed the limited number of users, once a first user classified as a member of said social group moves within the modular on-line virtual environment from the first on-line module to the second on-line module; and
    if a subsequent respective user, classified as a member of the same social group as the first user, moves within the modular on-line virtual environment from the first on-line module to the second on-line module, the server is operable to place the subsequent respective user in the same selected instance of the second on-line module as the first user.

2. A server according to claim 1, in which the predetermined criterion for classifying two or more users as belonging to a social group comprises one or more selected from the list consisting of:
    i. the two or more users both using an exit to the second module within a predetermined time period;
    ii. the two or more users remaining within a predetermined distance of each other for a predetermined time period;
    iii. the two or more users communicating with each other within a predetermined period of time prior to at least one of them moving to the second module;
    iv. at least one of the two or more users using one of a predetermined list of keywords during communications with the other one of the two or more users;
    v. at least one of the two or more users directing an avatar representing that user to perform one of a predetermined list of actions within a predetermined distance of the other of the two or more users;
    vi. one user invites another to join in an instance of a module, and that other accepts the invitation; and
    vii. the two or more users share an interactive feature of an instance of a module.

3. A server according to claim 1, in which the behaviour analyzer is operable to declassify a given user as being in a social group if the given user's subsequent behaviour satisfies a further predetermined criterion, the further predetermined criterion comprising one or more selected from the list consisting of:
    i. that given user does not use an exit to the second module for a predetermined period of time after at least one other member of the social group has done so;
    ii. that given user does not remain, for a predetermined period of time, within a predetermined distance of a member of the social group, during another predetermined period of time;
    iii. that given user does not communicate with a member of the social group for a predetermined period of time;
    iv. that given user uses one of a predetermined list of keywords during communications with one or more of the member of the social group; and
    v. that given user directs an avatar representing that user to perform one of a predetermined list of actions.

4. A server according to claim 1, in which the module instance selector is operable to choose between two or more social groups that a given user is the current member of by evaluating and comparing one or more parameters associated with the predetermined criterion used to associate the user with each of the two or more social groups.

5. A server according to claim 1, in which the module instance selector is operable to select, where two or more possible instances of the second module can accommodate a social group, an instance of the second module responsive to an average of user-based data for the members of the social group.

6. A server according to claim 1, in which the module instance selector is operable to retain information about which instances of which modules a given user visits over the course of an on-line session, and by default returns the given user to the same instance of a module if the given user returns to that module during the on-line session.

7. A server according to claim 1, in which the server is operable to assign new users to instances of a module such that one or more instances of the module retain a predetermined minimum spare capacity.

8. A server according to claim 1 in which, if such instances of the second module are available, the module instance selector is operable to select an instance of the second module with sufficient capacity to still have a predetermined minimum spare capacity remaining in the event that all the members of the social group move to that instance of the second module.

9. A server according to claim 1, in which the module instance selector is operable to select an instance of the second module that has the capacity to accommodate the greatest number of the social group.

10. A method of administering a modular on-line virtual environment using a server, each on-line module of the on-line virtual environment having a plurality of parallel instances each having a capacity to host a limited number of users, the method comprising the steps of:

receiving via a network communications arrangement data representative of actions of users within an instance of the plurality of instances of a first on-line module of the modular on-line virtual environment, and transmitting to each of the users within the instance of the first on-line module data representative of the actions of each other user within the instance of the first on-line module;

using a behaviour analyzer to analyse user behaviour within the instance of the first on-line module;

if the behaviour of two or more users satisfies a predetermined criterion, then classifying the two or more users as belonging to a social group comprising the two or more users;

using a module instance selector to select an instance of a second on-line module for one of the users that has a capacity to accommodate one or more further members of the social group so that if said one of the users and the one or more further members of the social group join that instance of the second on-line module, the number of users of that instance of the second on-line module will not exceed the limited number of users, once a first user classified as a member of said social group moves within the modular on-line virtual environment from the first on-line module to the second on-line module; and if a subsequent respective user, classified as a member of the same social group as the first user, moves within the modular on-line virtual environment from the first on-line module to the second on-line module, the server placing that subsequent respective user in the same selected instance of the second on-line module as the first user.

11. A non-transitory computer-readable medium having instructions stored thereon, the instructions, when executed by a processor, cause the processor to perform a method of administering a modular on-line virtual environment using a server, each on-line module of the on-line virtual environment having a plurality of parallel instances each having a capacity to host a limited number of users, the method comprising the steps of:

receiving via a network communications arrangement data representative of actions of users within an instance of the plurality of instances of a first on-line module of the modular on-line virtual environment, and transmitting to each of the users within that instance of the first on-line module data representative of the actions of each other user within the instance of the first on-line module;

analyzing user behaviour within the instance of the first on-line module;

if the behaviour of two or more users satisfies a predetermined criterion, then classifying the two or more users as belonging to a social group comprising the two or more users;

selecting an instance of a second on-line module for one of the users that has a capacity to accommodate one or more further members of the social group so that if said one of the users and the one or more further members of the social group join that instance of the second on-line module, the number of users of that instance of the second on-line module will not exceed the limited number of users, once a first user classified as a member of the social group moves within the modular on-line virtual environment from the first on-line module to the second on-line module; and if a subsequent respective user, classified as a member of the same social group as the first user, moves within the modular on-line virtual environment from the first on-line module to the second on-line module, the server placing that subsequent respective user in the same selected instance of the second on-line module as the first user.

* * * * *